(12) United States Patent
Mardiks Rappaport et al.

(10) Patent No.: US 10,938,801 B2
(45) Date of Patent: Mar. 2, 2021

(54) NONCE HANDLER FOR SINGLE SIGN ON AUTHENTICATION IN REVERSE PROXY SOLUTIONS

(71) Applicant: MICROSOFT TECHNOLOGY LICENSING, LLC, Redmond, WA (US)

(72) Inventors: Nir Mardiks Rappaport, Bellevue, WA (US); Vikas Malik, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 299 days.

(21) Appl. No.: 16/138,488

(22) Filed: Sep. 21, 2018

(65) Prior Publication Data
US 2020/0099675 A1   Mar. 26, 2020

(51) Int. Cl.
*H04L 29/06* (2006.01)
*H04L 29/08* (2006.01)

(52) U.S. Cl.
CPC ...... *H04L 63/0815* (2013.01); *H04L 63/0281* (2013.01); *H04L 63/0807* (2013.01); *H04L 67/146* (2013.01); *H04L 67/2814* (2013.01)

(58) Field of Classification Search
CPC ............. H04L 63/0815; H04L 63/0281; H04L 63/0807; H04L 67/146; H04L 67/2814; H04L 63/1466; G06F 21/41
See application file for complete search history.

(56) References Cited

U.S. PATENT DOCUMENTS 9,800,681 B2   10/2017   Sarukkai et al.
10,609,070 B1 *  3/2020  Farmer, III ........... H04L 63/126
(Continued)

FOREIGN PATENT DOCUMENTS

WO    2012145827 A1   11/2012
WO    2018085733 A1    5/2018

OTHER PUBLICATIONS

Odelu et al., "Efficient and Secure Time-Key Based Single Sign-On Authentication for Mobile Devices", IEEE Access ( vol. 5), pp. 27707-27721, Date of Publication: Nov. 27, (Year: 2017).*
(Continued)

*Primary Examiner* — Morshed Mehedi
(74) *Attorney, Agent, or Firm* — Newport IP, LLC; Jacob P. Rohwer

(57) ABSTRACT

Methods, systems, and media are shown for providing a reverse proxy system with SSO capability involving receiving an authentication response message from a client that includes an authentication token and a unique session identifier and determining whether the identifier is stored on the proxy service. If the session identifier is stored on the proxy service, sending the authentication response message to a service provider to which the authentication response message is directed. If the session identifier in the authentication response message is not stored on the proxy service: sending a login request message to the service provider to which the authentication response message is directed, receiving an authentication request message from the service provider that includes an other unique session identifier and redirects the authentication request message to an identity provider, storing the other session identifier, and sending the authentication request message with the other identifier to the client.

20 Claims, 14 Drawing Sheets

(56) References Cited

U.S. PATENT DOCUMENTS

| | | | |
|---|---|---|---|
| 2004/0044768 A1 | 3/2004 | Takahashi | |
| 2006/0277596 A1* | 12/2006 | Calvert | H04L 67/02 726/3 |
| 2009/0199276 A1* | 8/2009 | Schneider | H04L 63/0815 726/5 |
| 2012/0151568 A1* | 6/2012 | Pieczul | H04L 67/02 726/8 |
| 2013/0198801 A1* | 8/2013 | Nishizawa | H04L 63/20 726/1 |
| 2015/0200924 A1* | 7/2015 | Parla | H04L 63/04 726/7 |

OTHER PUBLICATIONS

Sakimura, et al., "OpenID Connect Core 1.0 incorporating errata set 1", Retrieved From: https://openid.net/specs/openid-connect-core-1_0.html#NonceNotes, Nov. 8, 2014, 101 Pages.

Ayadi, et al., "HTTP Session Management: Architecture and Cookies Security", In Conference on Network and Information Systems Security, May 18, 2011, 7 Pages.

"International Search Report and Written Opinion Issued in PCT Application No. PCT/US2019/039663", dated Sep. 18, 2019, 17 Pages.

Pujolle, et al., "Secure Session Management with Cookies", In Proceeding of 7th International Conference on Information, Communications and Signal Processing, Dec. 8, 2009, 6 Pages.

\* cited by examiner

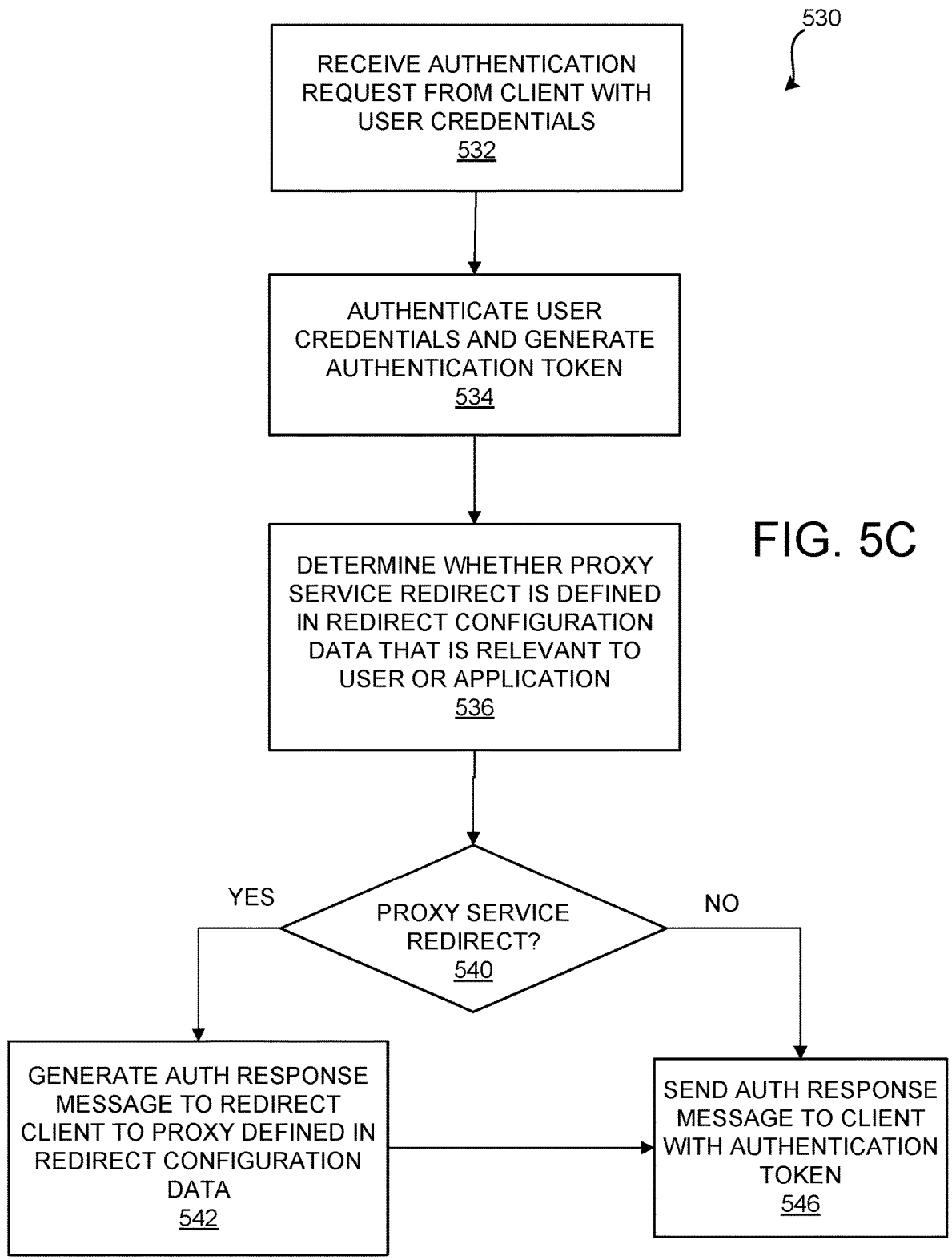

NONCE HANDLER FOR SINGLE SIGN ON AUTHENTICATION IN REVERSE PROXY SOLUTIONS

BACKGROUND

In cyber security, malicious actors or attackers frequently attempt to penetrate computer systems to access or corrupt files with sensitive information or to drop malicious files on a machine's file system, using legit (vulnerable) files for malicious use or accessing to files with sensitive information. For example, financial or personal information may be taken and sold or utilized to steal funds. Important information for public and private entities can be stolen, corrupted or destroyed.

One approach often utilized by an attacker is a network attack known as a replay attack or playback attack in which a valid data transmission, e.g. from a client browser, is intercepted by the attacker and replayed or repeated in order to gain access to computer resources. For example, a computer system requires a user to provide their user credentials, e.g. user name and password, in order to obtain access to resources supported by the computer system. An attacker intercepts the user credentials during the user's exchange with the computer system. Subsequently, the attacker repeats or replays the intercepted user credentials to penetrate the computer system.

To prevent replay attacks, many systems utilize a unique, random session identifier value with each login session, such as a nonce value or session token. For example, the computer system can generate a nonce value unique to a session and hash the nonce value using a hash function that only the computer system can verify later by generating the hash again from the nonce and matching it against the hash value received.

The computer system provides the nonce value and hashed nonce value to the client, which stores the nonce and utilizes the nonce and hashed nonce values in subsequent communications with the computer system during the session. The nonce is typically stored in a cookie placed on the client by the computer system that is associated with a domain of the computer system, e.g. box.com. The computer system is able to regenerate the hashed nonce value using the nonce value stored by the computer system for the session and compare the received hashed nonce value to the regenerated hashed nonce value. If the received hashed nonce value does not match the regenerated hashed nonce value, then the communication is considered to be an attack and is rejected by the computer system.

However, many systems utilize a reverse proxy as an intermediate between a client device and a computer system. For example, a reverse proxy may be used to provide access to a server that is behind a firewall. When a reverse proxy service is utilized, communications between the client device and the computer system are redirected to pass through the reverse proxy service. However, because the reverse proxy service has a different domain from the computer system, e.g. box.com.proxy.ms, the proxy service does not have the nonce value generated by the computer system for the session. As a result, the reverse proxy service is unable to provide the nonce generated by the computer system for the session and, consequently, the communications from the reverse proxy service are considered invalid by the computer system and rejected rendering the reverse proxy service unusable.

It is with respect to these and other technical challenges that the disclosure made herein is presented.

SUMMARY

Preventing a repeat or playback attack on a computer system using a unique session identifier during authentication is a desirable and widely used security measure. However, it can be advantageous to also utilize a reverse proxy service for communications between a user client and a service provider. However, a conventional reverse proxy service utilizes a different domain from a domain of the service provider. The difference is domains can result in the conventional reverse proxy service being unable to access a unique session identifier associated with the domain of the service provider, which prevents successful authentication. The disclosed technology provides a solution that permits a reverse proxy service to be utilized to handle communications between a user client and a service provider while also permitting unique session identifiers to be utilized in authentication to prevent repeat or playback attacks.

In order to realize the technical benefits mentioned briefly above, certain implementations of the technologies disclosed herein can perform single-sign-on authentication in a system with a reverse proxy service, which involves sending a first login request from a client to a service provider to initiate a first login session. In response to the first login request, the service provider generates a first unique session identifier, stores the first unique session identifier, and hashes the first unique session identifier to create a first session identifier hash. The service provider sends a first authentication request message to the client that contains the first session identifier and first session identifier hash and redirects the first authentication request message to an identity provider.

In response to the first authentication request message, the client stores the first session identifier and sends a first authentication request to the identity provider. The identity provider authenticates the client responsive to the first authentication request, generates a first authentication token, and sends a first authentication response to the client with the first authentication token and redirecting the client to a proxy service. The client receives the first authentication response with the first authentication token and redirects the first authentication response to the proxy service with the first session identifier.

The proxy service receives the first authentication response and determines whether the first session identifier is stored on proxy service. If the first session identifier is not stored on the proxy service, the proxy service sends a second login request to the service provider to initiate a second login session. In response to the second login request, the service provider, generates a second unique session identifier, stores the second unique session identifier, and hashes the second unique session identifier to create a second session identifier hash. The service provider sends a second authentication request message from the service provider to the proxy service that contains the second session identifier and redirects the second authentication request message to the identity provider.

The proxy service stores the second session identifier and sends the second authentication request message to the client. The client stores the second session identifier and sends the second authentication request message to the identity provider. The identity provider authenticates the client responsive to the second authentication request, generates a second authentication token, and sends a second authentication response to client with the second authentication token and redirecting the client to the proxy service. The client receives the second authentication response with the second authentication token and redirects the second authentication response to the proxy service with the second session identifier.

The proxy service receives the second authentication response and determines whether the second session identifier is stored on the proxy service. If the second session identifier is stored on the proxy service, the proxy service sends the second authentication response to the service provider to complete the second login session.

In some implementations, the first session identifier comprises a first nonce and the second session identifier comprises a second nonce. In certain implementations, the second login request includes state data that matches state data in the first login request. In still other implementations, proxy configuration data is used in the identity provider to identify the proxy service. In yet other implementations, one or more parameters included in the first authentication request are utilized to identify the proxy service. In particular implementations, the proxy service is a suffix proxy service and identifying data for the suffix proxy service is appended to a universal resource corresponding to the service provider.

In an implementation of a reverse proxy system with single-sign-on authentication capability, a proxy service is configured to receive an authentication response message from a client that includes an authentication token and a unique session identifier and determine whether the unique session identifier in the authentication response message received from the client is stored on the proxy service. If the unique session identifier in the authentication response message received from the client is stored on the proxy service, the proxy service is configured to send the authentication response message with the authentication token and the unique session identifier to a service provider to which the authentication response message is directed.

If the unique session identifier in the authentication response message received from the client is not stored on the proxy service, the proxy service is configured to send a login request message to the service provider to which the authentication response message is directed, receive an authentication request message from the service provider that includes an other unique session identifier and redirects the authentication request message to an identity provider, store the other unique session identifier on the proxy service, and send the authentication request message with the other unique session identifier to the client.

As discussed briefly above, implementations of the technologies disclosed herein can enable authentication using unique session identifiers to be utilized with a reverse proxy service to reduce the vulnerability of a computer system to playback attack during authentication thereby avoiding inefficiencies due to compromised or corrupted computer resources. More secure computer systems will result in higher availability and efficiency of computer resources for authorized users of the computer systems. Other technical benefits not specifically identified herein can also be realized through implementations of the disclosed technologies.

It should be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5C is a flow diagram showing an illustrative example of a process in an identity provider for redirecting a client device to a reverse proxy service during a single-sign-on login session with a service provider in accordance with the disclosed technology;

DETAILED DESCRIPTION

Figure 1:
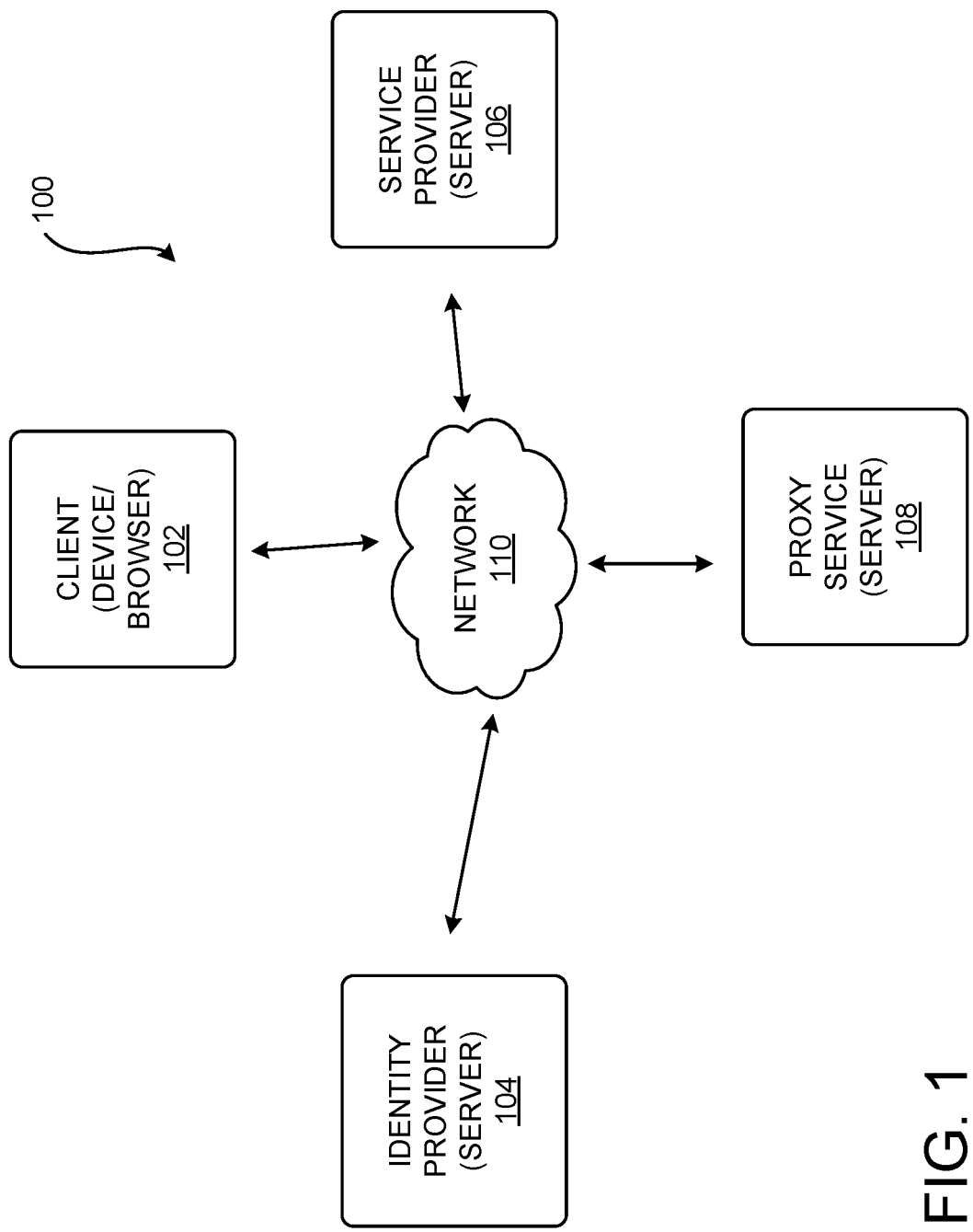
FIG. 1 is a network architecture diagram showing an illustrative example of a networked computing environment involving a client device, an identity provider, a service provider and a reverse proxy service.

The following detailed description is directed to an approach for redirecting a client device through a reverse proxy service during a single-sign-on (SSO) login session with a service provider. As discussed briefly above, the use of a unique session identifier, such as a nonce, is advantageous to the prevention of repeat or replay attacks to gain access to computer systems. It is also advantageous to utilize a reverse proxy service to manage communications between the client device and the service provider.

However, the use of a reverse proxy service is generally incompatible with conventional approaches to SSO login using a unique session identifier because the unique session identifier generated by the service provider is typically sent to the client device and stored thereon in association with a specific domain for the service provider, e.g. box.com, such as in form of a cookie placed on a browser on the client. However, because a reverse proxy service typically utilizes a different domain, e.g. box.com.proxy.ms, the unique session identifier is inaccessible to the reverse proxy service. The reverse proxy service is unable to provide the unique session identifier to the service provider typically resulting in rejection of the login attempt.

In the disclosed technology, a client initiates a first login attempt with a service provider and the service provider responds by sending a first session identifier and a hash of the first session identifier to the client and redirecting the client to an identity provider for authentication. The identity provider authenticates the user credentials provided by the client in the first login attempt and generates a first authentication token with the first session identifier hash. The identity provider also determines whether a reverse proxy service is defined pertaining to the client and, if a reverse proxy service is defined, sends an authentication response with the first authentication token to the client and that redirects the client to the reverse proxy service.

The client provides the first authentication token, the first session identifier and first session identifier hash to the reverse proxy service. If the reverse proxy service does not recognize the first session identifier provided by the client device, then the reverse proxy service initiates a second login attempt with the service provider. The service provider responds to the second login attempt by sending a second session identifier to the reverse proxy service and redirecting to the identity provider. The reverse proxy service stores the second session identifier and passes the response to the client.

The identity provider authenticates the user credentials provided by the client in the second login attempt, generates a second authentication token with the second session identifier hash. The identity provider sends a second authentication response that redirects the client to the reverse proxy service and includes the second authentication token. The client provides the second authentication response and the second session identifier to the reverse proxy service. Because the reverse proxy service stored the second session identifier, the reverse proxy service recognizes the second session identifier and passes the second authentication token and second session identifier to the service provider. The service provider recognizes the second session identifier and completes the second login attempt based on the second authentication token.

The disclosed technology improves computer security by enabling a reverse proxy service to be utilized along with SSO authentication using a unique session identifier. The security and resource utilization advantages obtained from using a reverse proxy service are combined with the security obtained from using a unique session identifier in SSO authentication sessions.

While the subject matter described herein is presented in the general context of program modules that execute in conjunction with the execution of an operating system and application programs on a computer system, those skilled in the art will recognize that other implementations can be performed in combination with other types of program modules. Generally, program modules include routines, programs, components, data structures, and other types of structures that perform particular tasks or implement particular abstract data types. Moreover, those skilled in the art will appreciate that the subject matter described herein can be practiced with other computer system configurations, including hand-held devices, multiprocessor systems, microprocessor-based or programmable customer electronics, computing or processing systems embedded in devices (such as wearables, automobiles, home automation etc.), minicomputers, mainframe computers, and the like.

In the following detailed description, references are made to the accompanying drawings that form a part hereof, and which are shown by way of illustration specific configurations or examples. Referring now to the drawings, in which like numerals represent like elements throughout the several figures, aspects of single-sign-on authentication in a system with a reverse proxy service that provides improved security will be described.

FIG. 1 is a network architecture diagram showing an illustrative example of a network computing environment 100 involving a client device 102 in communication with identity provider 104, service provider 106 and reverse proxy service 108 through network 110. Client device 102 can be a device, such as a personal computer or a smart phone, that a user utilizes to access resources through the network, such as services provided by service provider 106.

Identity provider (IdP) 104 creates, maintains and manages identity information for users and provides authentication services to applications supported by service provider 106. For example, IdP 104 can be a Security Assertion Markup Language (SAML) based identity provider that issues authentication assertions, e.g. authentication tokens, in conjunction with a user's SSO profile that are consumed by SAML service provider 106. In another example, IdP 104 can provide an OpenID Connect (OIDC) authentication layer of the OAuth 2.0 standard controlled by the OPENID FOUNDATION of San Ramon, Calif., which provides identity authentication tokens to OIDC relying service provider 106.

Service provider 106 supports applications that can be accessed by client 102 through network 110. When client 102 attempts to access an application on service provider 106 that requires authentication, the application redirects the client to IdP 104 to validate the client's authenticity, such as by checking the client's user credentials, e.g. username and password, against an identity database, e.g. the Active Directory (AD) directory service provided by MICROSOFT CORP. of Redmond, Wash. If authentication of the client's user credentials succeeds, IdP 104 returns the client to the application with an authentication token representing validation of the client's user credentials.

Figure 2A:
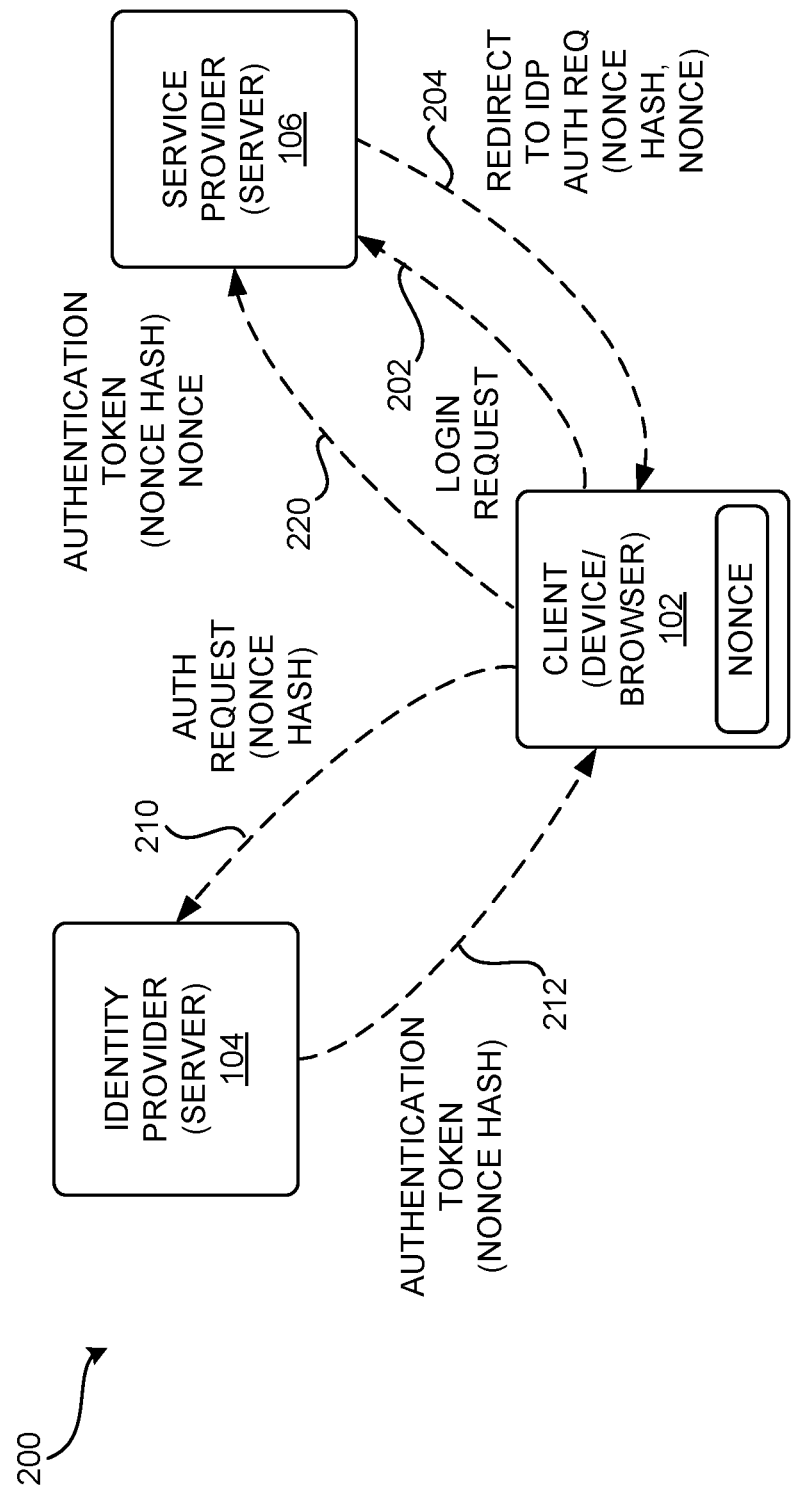
FIG. 2A is a software architecture diagram showing an illustrative example of a conventional exchange of messages between a client device, a service provider and an identity provider for a single-sign-on authentication without a reverse proxy service.

FIG. 2A is a software architecture diagram that illustrates a simplified example of a conventional exchange of messages 200 between client device 102, IdP 104, and service provider 106 for an SSO authentication session without a reverse proxy service. In this example, at 202, client 102 initiates a login request to an application on service provider 106. Service provider 106 generates a unique session identifier value, e.g. a nonce value in this example, and hashes the nonce, e.g. encrypts the nonce using a public key. At 204, service provider 106 sends a response to client 102 that contains the nonce and the nonce hash and redirects client 102 to IdP 104 for authentication.

Client 102 stores the nonce and sends an authentication request with the nonce hash, at 210, to IdP 104 for authentication of the client's user credentials. If IdP 104 successfully authenticates the client's user credentials, then, at 212, IdP 104 sends an authentication token with the nonce hash to client 102. The inclusion of the nonce hash in the authentication token prevents the authentication token from being used by any other client that does not have the corresponding nonce value.

At 220, client 102 forwards the authentication token, the nonce and the nonce hash to service provider 106. Service provider 106 verifies that no replay attack has occurred by regenerating the nonce hash value from the nonce value it stored for the session and comparing the regenerated nonce hash value to the received nonce hash value. The service provider 106 utilizes the authentication token as validation of the identity of client 102 and grants access to the application to which 102 requested access.

Figure 2B:
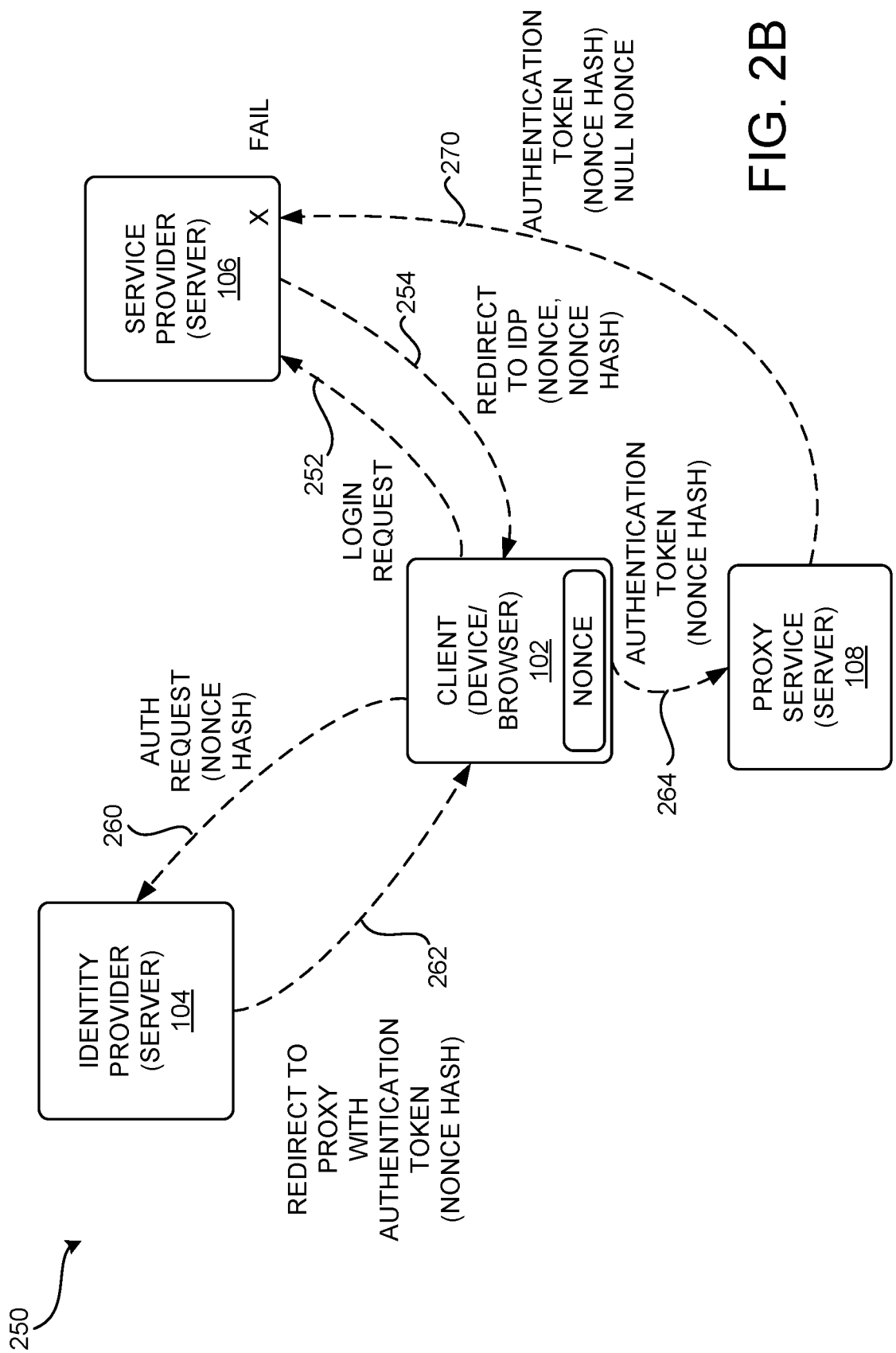
FIG. 2B is a software architecture diagram showing an illustrative example of a conventional exchange of messages between a client device, a service provider and an identity provider utilizing a reverse proxy service that results in failure of a single-sign-on authentication.

FIG. 2B is a software architecture diagram showing an illustrative example of a conventional exchange of messages 250 between client device 102, service provider 106 and identity provider 104 utilizing reverse proxy service 108 that results in failure of a single-sign-on authentication. In this example, similar to the example of FIG. 2A above, client 102 initiates a first login request, at 252, and receives, at 254, a response from service provider 106 with a nonce and nonce hash that redirects client 102 to IdP 104. Client 102 stores the nonce, e.g. using a cookie on client 102 that is associated with a domain for service provider 106, e.g. box.com.

At 260, client 102 redirects its authentication request to IdP 104 along with the nonce hash. IdP 104 authenticates the user credentials from client 102, generates an authentication response with the authentication token and nonce hash that redirects client 102 to reverse proxy service 108. At 264, client 102 directs the authentication response with the authentication token received from IdP 104 to service provider 106 through reverse proxy service 108. However, because reverse proxy service 108 has a different domain from the service provider, e.g. box.com.proxy.ms, the proxy service does not have access to the nonce for the session as provided by service provider 106. Because the reverse proxy service cannot provide the nonce with the authentication token that corresponds to the nonce hash in the authentication token, service provider 106 cannot verify the session using the nonce and rejects completion of the login attempt as an attempted replay attack.

The disclosed technology provides an approach whereby a reverse proxy service obtains a unique session identifier, e.g. a nonce, from a service provider for a login session for a client in which the service provider redirects the client to an identity provider for authentication. The disclosed technology generally does not require modifications to the client, service provider or identity provider, but can be implemented in the reverse proxy service. As a result, for example, the disclosed technology can be implemented to enable a client to be authenticated to a service provider by an IdP using a reverse proxy service, where the IdP, client and service provider can operate in accordance with a standard identity protocol such as SAML or OpenID.

Figure 3:
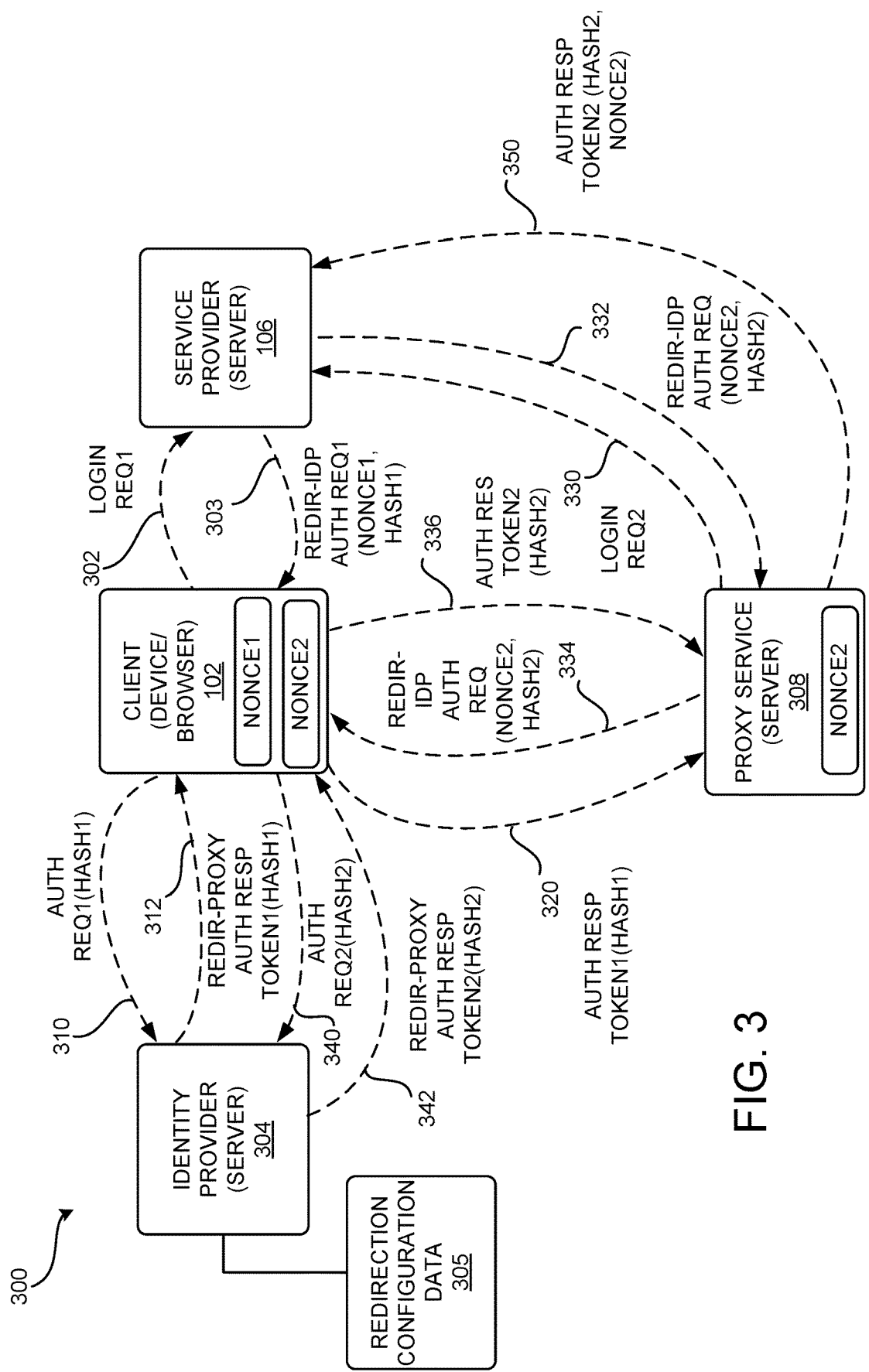
FIG. 3 is a software architecture diagram showing an illustrative example of an exchange of messages between a client device, a service provider and an identity provider utilizing a reverse proxy service for a single-sign-on authentication in accordance with the disclosed technology.

FIG. 3 is a software architecture diagram showing an illustrative example of an exchange of messages 300 between client device 102, service provider 106 and an identity provider 304 utilizing a reverse proxy service 308 for a single-sign-on authentication in accordance with the disclosed technology.

Consistent with the conventional examples described above with respect to FIGS. 2A and 2B, at 302, client 102 initiates a first login request to service provider 106. In response to the first login request, service provider 106 generates and hashes a first nonce NONCE1 to produce first nonce hash HASH1. At 303, in REDIR-IDP AUTH REQ1 (NONCE1, HASH1), service provider 106 redirects client 102 to IdP 304 for authentication and sends NONCE1 and HASH1 to client 102.

Client 102 stores NONCE1, such as in a cookie associated with the service provider domain that placed on client 102 by service provider 106. At 310, client 102 sends a first authentication request AUTH REQ1 that contains HASH1 to IdP 304 with user credentials for the user attempting to login to an application on service provider 106. IdP 304 authenticates the client's user credentials and generates a first authentication token TOKEN1 that include HASH1 and also searches redirection configuration data 305 for data defining a reverse proxy service relating to the client's user credentials.

At 312, in REDIR-PROXY AUTH RESP TOKEN1 (HASH1), IdP 304 sends an authentication response to client 102 with TOKEN1 and HASH1 that redirects client 102 to reverse proxy service 308, which was defined in redirection configuration data 305. At 320, client 102 redirects the authentication response containing TOKEN1 and HASH1 along with NONCE1 to reverse proxy service 308. For example, client 102 can be redirected to reverse proxy service 308 using a suffix proxy approach, wherein the name of the proxy server is appended to a URL for the application on service provider 106 to which client 102 is attempting to login. For example, a URL of box.com that resolves to an application on service provider 106 can be modified to box.com.proxy.ms, which resolves to reverse proxy service 308, but from which the original URL box.com can be extracted by the reverse proxy service 308. Other approaches to establishing reverse proxy service for a client can also be utilized with the disclosed technology.

In response to receiving the authentication response with TOKEN1, NONCE1 and HASH1, reverse proxy service 308 searches its local data stores for NONCE1. Because client 102 initiated the first login request at 302 in relation to the service provider domain, NONCE1 is not present on reverse proxy service 308. As a result, at 330, reverse proxy service 308 initiates a second login request AUTH REQ2 to service provider 106.

In response to the second login request, service provider 106 generates and hashes a second nonce NONCE2 to produce second nonce hash HASH2. At 332, in REDIR-IDP AUTH REQ2(NONCE2, HASH2), service provider 106 redirects reverse proxy service 308 to IdP 304 for authentication and sends NONCE2 and HASH2 to reverse proxy service 308, which stores NONCE2. Reverse proxy service 308 then passes REDIR-IDP AUTH REQ2(NONCE2, HASH2) to client 102.

Client 102 stores NONCE2 and, at 340, sends a second authentication request AUTH REQ2 to IdP 304 with the client's user credentials and HASH2. IdP 304 authenticates the client's user credentials and generates a second authentication token TOKEN2 with HASH2, which is sent to client 102 at 342 in REDIR-PROXY AUTH RESPTOKEN2 (HASH2). Note that redirection to the proxy may not be necessary at this point if client 102 is configured to reply to the URL for reverse proxy service 308. At 336, client 102 adds NONCE2 to the authentication response and sends AUTH RESPTOKEN2 (NONCE2, HASH2) to reverse proxy service 308.

Reverse proxy service 308 searches its local data stores for NONCE2, which is found because NONCE2 from the REDIR-IDP AUTH REQ2(NONCE2, HASH2) message sent by service provider 106 to reverse proxy service 308 at 332 was stored by reverse proxy service 308. As a result, at 350, reverse proxy service 308 sends the authentication response AUTH RESP TOKEN2(NONCE2, HASH2) to service provider 106.

Service provider 106 receives AUTH RESP TOKEN2 (NONCE2, HASH2) and utilizes HASH2 to verify that no replay attack has occurred by regenerating the nonce hash from the value for NONCE2 that was stored for the session and comparing the regenerated hash value to the received hash value. If the received nonce hash value HASH2 matches the regenerated nonce hash value, then service provider 106 completes the second login session initiated by login request LOGIN REQ2 at 330. TOKEN2 validates the user credentials received from client 102. Note that the first login session associated with LOGIN REQ1 from client 102 at 302 is not completed.

Note that while the scenarios described herein reference a nonce, such as the nonce provided for in the OpenID protocol, the concepts described can be applied to other scenarios or protocols wherein a unique session identifier value is generated and utilized to prevent replay attacks. Similarly, while the scenarios described herein reference authentication tokens, the concepts described herein can be applied to other scenarios or protocols wherein other forms of identity authentication data is utilized by an identity provider to indicate that a client's user credentials have been authenticated.

Figure 4:
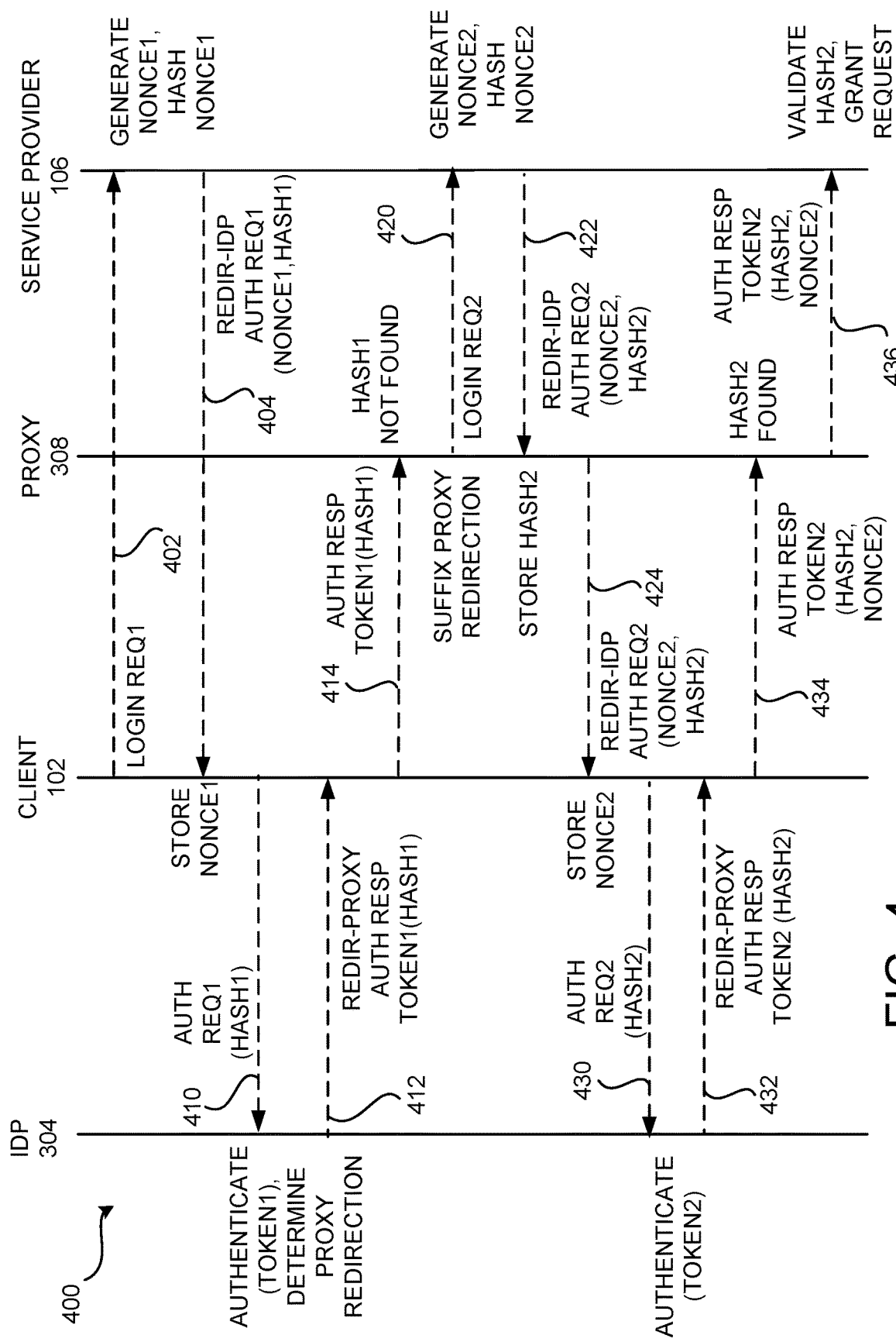
FIG. 4 is a messaging diagram showing an illustration of message transfer between a client device, a service provider and an identity provider utilizing a reverse proxy service for a single-sign-on authentication in accordance with the disclosed technology.

FIG. 4 is a messaging diagram showing an illustration of message transfer scenario 400 showing a sequence of messages between client device 102, service provider 106 and identity provider 304 utilizing reverse proxy service 308 for a single-sign-on authentication in accordance with the disclosed technology as discussed above with respect to FIG. 3.

At 402, client device initiates a first login session by submitting a first login request to service provider 106. In response, service provider 106 generates a first nonce NONCE1, which is hashed to create HASH1, e.g. using a first key known to service provider 106. At 404, service provider 106 responds by redirecting client 102 to IdP 304 and includes NONCE1, which client 102 stores locally, e.g. in a cookie on client 102 associated with the service provider domain that the client for which the client is requesting access, along with HASH1.

At 410, client 102 submits a first authentication request AUTH REQ1(HASH1), e.g. submits the credentials of a user using client 102 to access an application or domain on service provider 106. IdP 304 authenticates the user credentials and, if successful, generates TOKEN1 or similar data indicating that the user credentials are valid. IdP 304 is also configured to search for a proxy redirection defined for the login session, which can be based on one or more factors, such as the user's credentials or domain, parameters in the authentication request, or the domain of the application on service provider 106.

If a relevant proxy redirection definition is found, then, at 412, IdP 304 sends an authentication response containing TOKEN1 and HASH1 to client 102 that redirects client 102 to a reverse proxy service, i.e. REDIR-PROXY AUTH RESP(TOKEN1). As discussed above, one example of the redirection shown is a suffix proxy redirection that adds a proxy suffix to a URL for the application on service provider 106 that client 102 is attempting to access. At 414, client 102 adds NONCE1 to the authentication response and, due to redirection, forwards AUTH RESP TOKEN1(NONCE1, HASH1) to reverse proxy service 308.

Reverse proxy service 308 receives AUTH RESP TOKEN1(NONCE1, HASH1), examines NONCE1, and determines that it has not previously stored NONCE1. This determination causes reverse proxy service 308, at 422, to initiate a second login session with LOGIN REQ2 sent to service provider 106.

Service provider 106 responds to LOGIN REQ2 by generating and storing a second nonce NONCE2, hashing NONCE2 to create HASH2, and returning a message redirecting the login request to IdP 304 and which includes NONCE2 and HASH2, e.g. REDIR-IDP AUTH REQ2 (NONCE2, HASH2). The REDIR-IDP AUTH REQ2 (NONCE2, HASH2) message is directed to reverse proxy service 308, e.g. a suffix proxy URL that resolves to reverse proxy service 308, because LOGIN REQ2 originated with reverse proxy service 308.

Reverse proxy service 308 receives REDIR-IDP AUTH REQ2(NONCE2, HASH2), stores NONCE2 locally, and, at 424, passes REDIR-IDP AUTH REQ2(NONCE2, HASH2) through to client 102. Client 102 stores NONCE2 locally and, at 430, submits a second authentication request AUTH REQ2(HASH2) for the second login session to IdP 304.

IdP 304 authenticates the user credentials in AUTH REQ2, generates a second authentication token TOKEN2 with HASH2, and, at 432, sends a second authentication response with TOKEN2, e.g. REDIR-PROXY AUTH RESP TOKEN2(HASH2), to client 102. Client 102 appends NONCE2 to the second authentication response, e.g. AUTH RESPONSE TOKEN2(NONCE2, HASH2), and sends the second authentication response to reverse proxy service 308, at 434.

Reverse proxy service 308 recognizes NONCE2 because it was previously stored. Because reverse proxy service 308 recognizes NONCE2, it passes the second authentication response to service provider 106 at 436. Service provider 106 utilizes HASH2 to verify the second authentication response by regenerating the nonce hash value from the value of NONCE2 stored for the session and comparing the regenerated hash value to the value of received HASH2. If the hash values match, then the authentication response is verified. Service provider 106 then completes the second login session using TOKEN2. Subsequent communication between client 102 and service provider 106 passes through reverse proxy service 308.

Note that some session contextual data can be exchanged and maintained by the client 102, service provider 106, and reverse proxy service 308. For example, service provider context data indicating a resource on service provider 106 that client 102 is attempting to access may be maintained, e.g. a URL for a landing page on service provider 106.

It will be appreciated that the architecture and messaging shown in the examples associated with FIGS. 3 and 4 are illustrative and do not limit the scope of the disclosed technology. One of skill in the art will readily recognize that other architectures and message protocols may be utilized in keeping with the disclosed technology.

FIGS. 5A-D are flow diagrams showing an illustrative example of processes executing in client 102, service provider 106, IdP 304, and reverse proxy service 308. Note that the processes in client 102 and service provider 106 can be conventional processes for performing an authentication function defined under a protocol, such as OpenID or SAML, and the process in IdP 304 can be a conventional process for utilizing a proxy service. In one aspect of the disclosed technology, the process in reverse proxy service 308 manipulate the processes of client 102 and service provider 106 operating in accordance with a defined authentication protocol in order to implement a reverse proxy service in combination with a unique session identifier to prevent replay attacks.

Figure 5A:
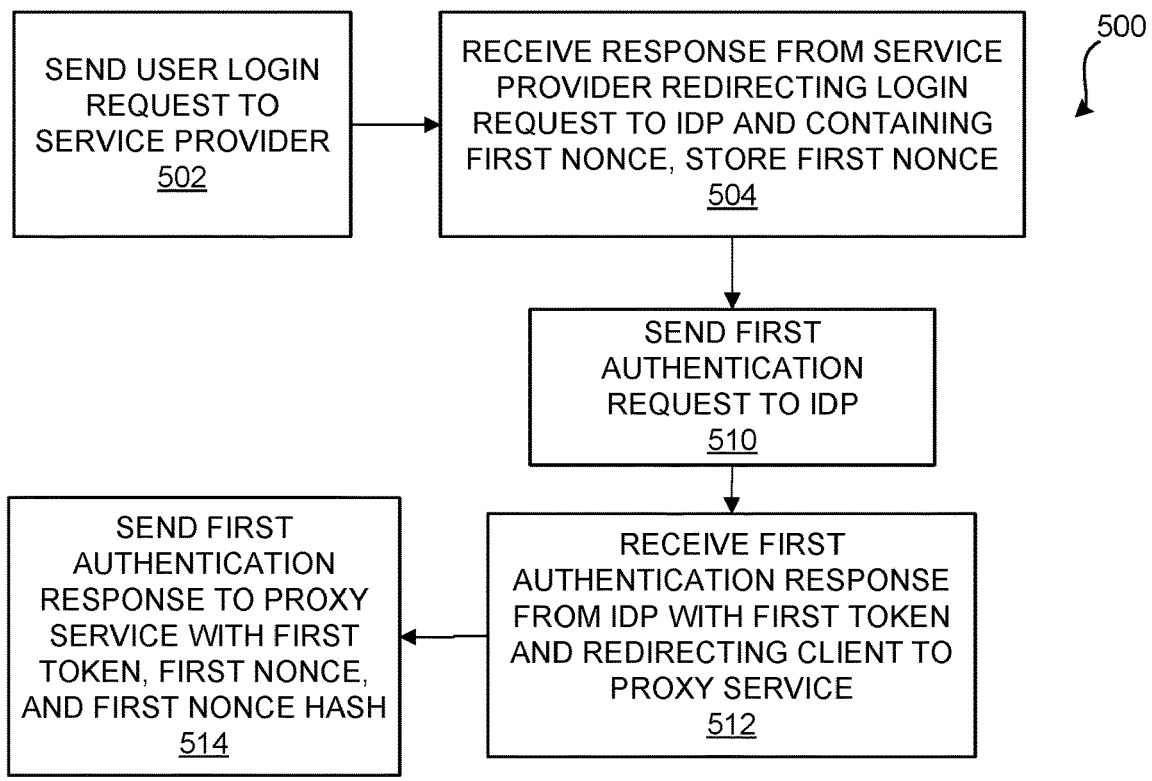
FIG. 5A is a flow diagram showing an illustrative example of a process in a client device for a single-sign-on login session with a service provider, where the client device is redirected to an identity provider for authentication.

FIG. 5A is a flow diagram showing an illustrative example of a login process 500 in client 102 for a single-sign-on login session with a service provider, where the client is redirected to IdP 304 for authentication. At 502, a user login request is sent to a service provider, e.g. service provider 106, to request access to an application or resource. At 504, a response is received from the service provider containing a first nonce and a first nonce hash and redirecting the login request to IdP 304 for authentication, e.g. a redirect_URI is defined in OpenID to send the client to IdP 304, and client 102 stores the received first nonce. At 510, client 102 sends a first authentication request to IdP 304 with user credentials and the first nonce hash to IdP 304.

At 512, client 102 receives a first authentication response, e.g. REDIR-PROXY AUTH RESP TOKEN1(HASH1), from IdP 304, with the first authentication token TOKEN1 and redirecting client 102 to reverse proxy service 308. Client 102 attaches the first nonce NONCE1 that was stored at 502 to the first authentication response, e.g. AUTH RESP TOKEN1(NONCE1, HASH1), and, at 514, forwards the first authentication response to reverse proxy service 308.

Figure 5B:
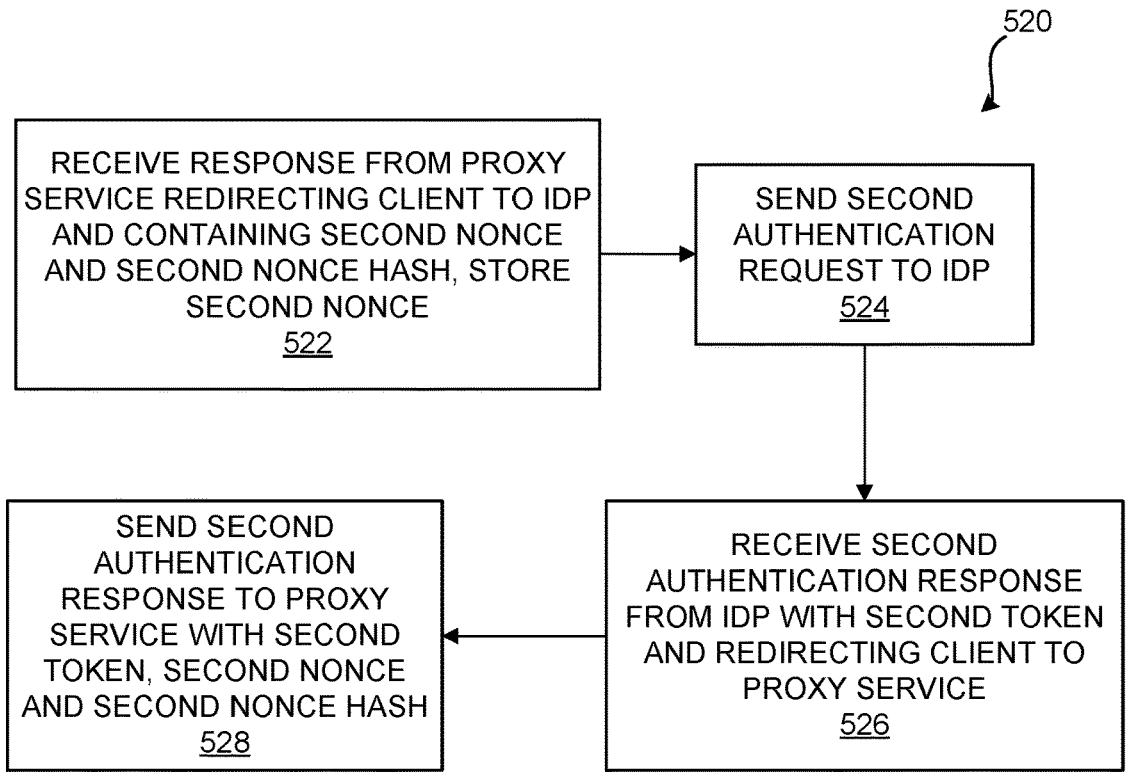
FIG. 5B is a flow diagram showing an illustrative example of a process in a client device for a single-sign-on login session with a service provider utilizing a reverse proxy service, where the client device is redirected to an identity provider for authentication.

FIG. 5B is a flow diagram showing an illustrative example of a process 520 in client device 102 for a single-sign-on login session with service provider 106 utilizing reverse proxy service 308, where client 102 is redirected to IdP 304 for authentication. In this example, process 520 follows the same logic as process 500 of FIG. 5A, but operates on a second login request, such as LOGIN REQ2 in FIGS. 3 and 4, involving a second nonce NONCE2 and second nonce hash HASH2 generated by the service provider 106 in response to the second login request.

At 522, a response is received from reverse proxy service 308, e.g. REDIR-IDP AUTH REQ(NONCE2, HASH2), redirecting the client 102 to IdP 304. Client 102 stores the received nonce NONCE2locally. At 524, client 102 sends a second authentication request, e.g. AUTH REQ2 in FIGS. 3 and 4, to IdP 304.

At 526, client 102 receives a second authentication response, e.g. AUTH RESP TOKEN2(HASH2) in FIGS. 3 and 4, from IDP 304 with the second authentication token TOKEN2 with HASH2 and redirecting client 102 to reverse proxy service 308. As noted above, in some examples, redirection may be unnecessary because client 102 is configured, at this point, to communicate with a suffix proxy URL corresponding to reverse proxy service 308 because it received the REDIR-IDP AUTH RESP (NONCE2, HASH2) message from reverse proxy service 308.

Client 102 attaches the second nonce NONCE2that was stored at 522 to the second authentication response, e.g. AUTH RESPTOKEN2(NONCE2, HASH2), and, at 528, forwards the second authentication response to reverse proxy service 308.

In the examples of FIGS. 5A and 5B, processes 500 and 520 execute logic to perform an SSO authentication in accordance with a defined authentication protocol, such as OpenID or SAML. Process 500 illustrates the logic operating, for a first login request, such as LOGIN REQ1 in FIGS. 3 and 4, while process 520 illustrates the logic operating, for a second login request, such as LOGIN REQ2 in FIGS. 3 and 4.

FIG. 5C is a flow diagram showing an illustrative example of a process 530 in IdP 304 for authenticating user credentials received from client 102 and redirecting client 102 to reverse proxy service 308 during a single-sign-on login session with service provider 106 in accordance with the disclosed technology. At 532, IdP 304 receives an authentication request, e.g. AUTH REQ1, from client 102 that includes user credentials for a user operating client 102. At 534, IdP 304 authenticates the user credentials and, if the user is authenticated, generates an authentication token, e.g. TOKEN1 or TOKEN2, which includes a nonce hash received with the authentication request, e.g. HASH1 or HASH2.

At 536, IdP 304 determines whether a reverse proxy service is defined in redirect configuration data that is relevant to the user or the application. For example, a specific reverse proxy service can be defined for a user or all the users in a particular domain. In another example, a reverse proxy service is defined for the application on service provider 106 for which the user is seeking authentication. The redirect configuration data can be predefined by a system administrator and, for example, provides a URL for the reverse proxy service.

If no reverse proxy service redirect is defined in the redirect configuration data, then control branches at 540 to 546 to send an authentication response message to client 102 with the authentication token generated at 534. The SSO authentication essentially proceeds in a conventional manner, such as the SSO scenario illustrated in FIG. 2A.

If a reverse proxy service redirect is defined in the redirect configuration data, then control branches at 540 to 542 to configure an authentication response message that redirect the client to the defined reverse proxy service, e.g. client 102 is redirected to reverse proxy service 308. Control proceeds to 546 to send the redirect authentication response message to client 102 with the authentication token generated at 534.

Figure 5D:
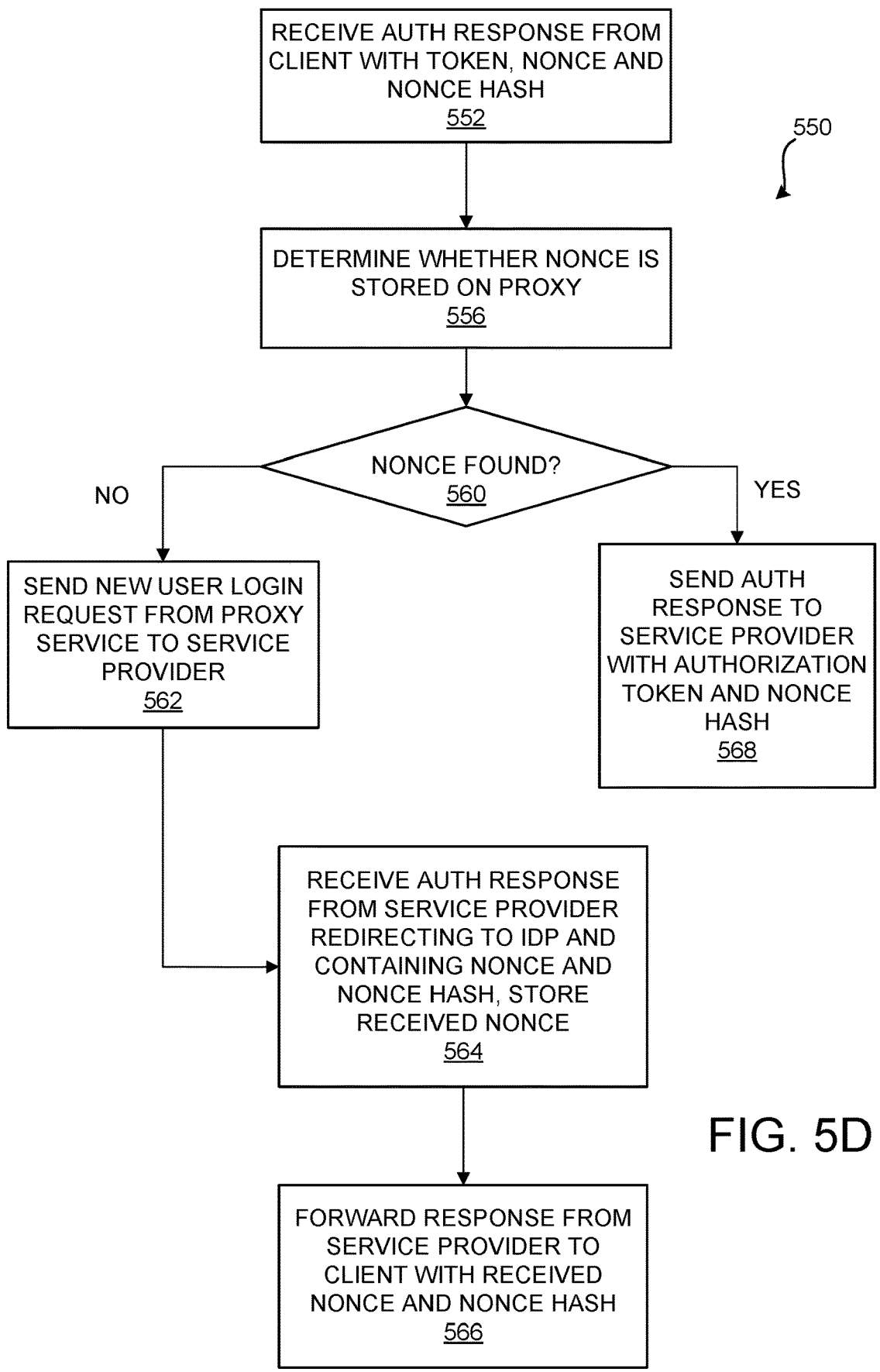
FIG. 5D is a flow diagram showing an illustrative example of a process in a reverse proxy service for authentication of a client device utilizing the reverse proxy service to establish single-sign-on login session with a service provider in accordance with the disclosed technology.

FIG. 5D is a flow diagram showing an illustrative example of a process 550 in reverse proxy service 308 for authentication of client 102 utilizing the reverse proxy service to establish single-sign-on login session with service provider 106 in accordance with the disclosed technology. Process 550 utilizes a nonce value contained in an authentication response received from client 102 to determine whether the login session to which the authentication response pertains was initiated by the client or the proxy. If the login session was initiated by the client, then the proxy initiates a new login session with the service provider in order to obtain a valid nonce value from the service provider.

At 552, reverse proxy service 308 receives an authentication response from client 102 that includes an authentication token with a nonce hash and a nonce. At 556, reverse proxy service 308 determines whether the nonce received in the authentication response was stored by reverse proxy service 308.

If the nonce is not stored by reverse proxy service 308, then the current login session was initiated by client 102 and reverse proxy service 308 will be unable to successfully complete the login session. Control branches at 560 to 562 for reverse proxy service 308 to send a new user login request from reverse proxy service 308 to service provider 106. Note that a login request can include service provider contextual data, such as a URL for a landing page on service provider 106, which can also be included in the authentication token received in the authentication response. The new user login request can include service provider contextual data that matches service provider contextual data from the authentication token, i.e. the contextual data from the original login request from client 102 to service provider 106, so that the new login request is directed to the same context on service provider 106 as the original login request, e.g. the same landing page.

Service provider 106 will respond to the new login request with a message redirecting the login request to IdP 304 for authentication and containing a new nonce and nonce hash. Reverse proxy service 308 receives the response message redirecting the login request, at 564, and stores the received nonce locally. At 566, reverse proxy service 308 forwards the response message for the new login session to client 102.

When reverse proxy service 308 receives an authentication response from client 102 that includes a nonce that was previously stored by reverse proxy service 308, e.g. at 564, then the received authentication response pertains to the new login session previously initiated by reverse proxy service 308 at 562. Control branches at 560 to 568, where reverse proxy service 308 forwards the authentication response to service provider 106. Because the nonce for the new login session can be verified by service provider 106, the new login session can be successfully completed. Subsequently, communications between client 102 and service provider 106 pass through reverse proxy service 308.

Figure 5E:
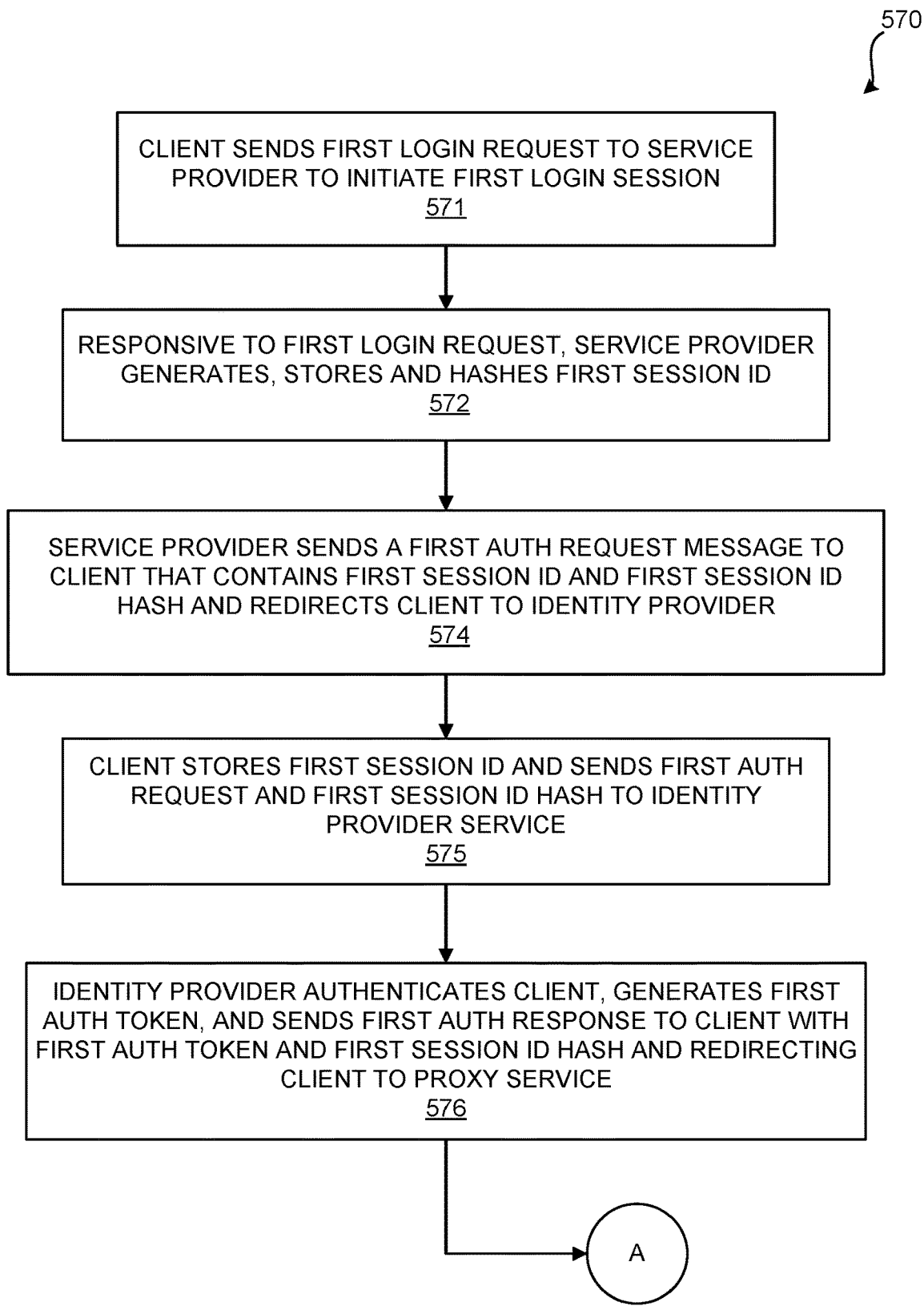
FIG. 5E is a flow diagram showing another illustrative example of a process in a reverse proxy service for authentication of a client device utilizing the reverse proxy service.
Figure 5F:
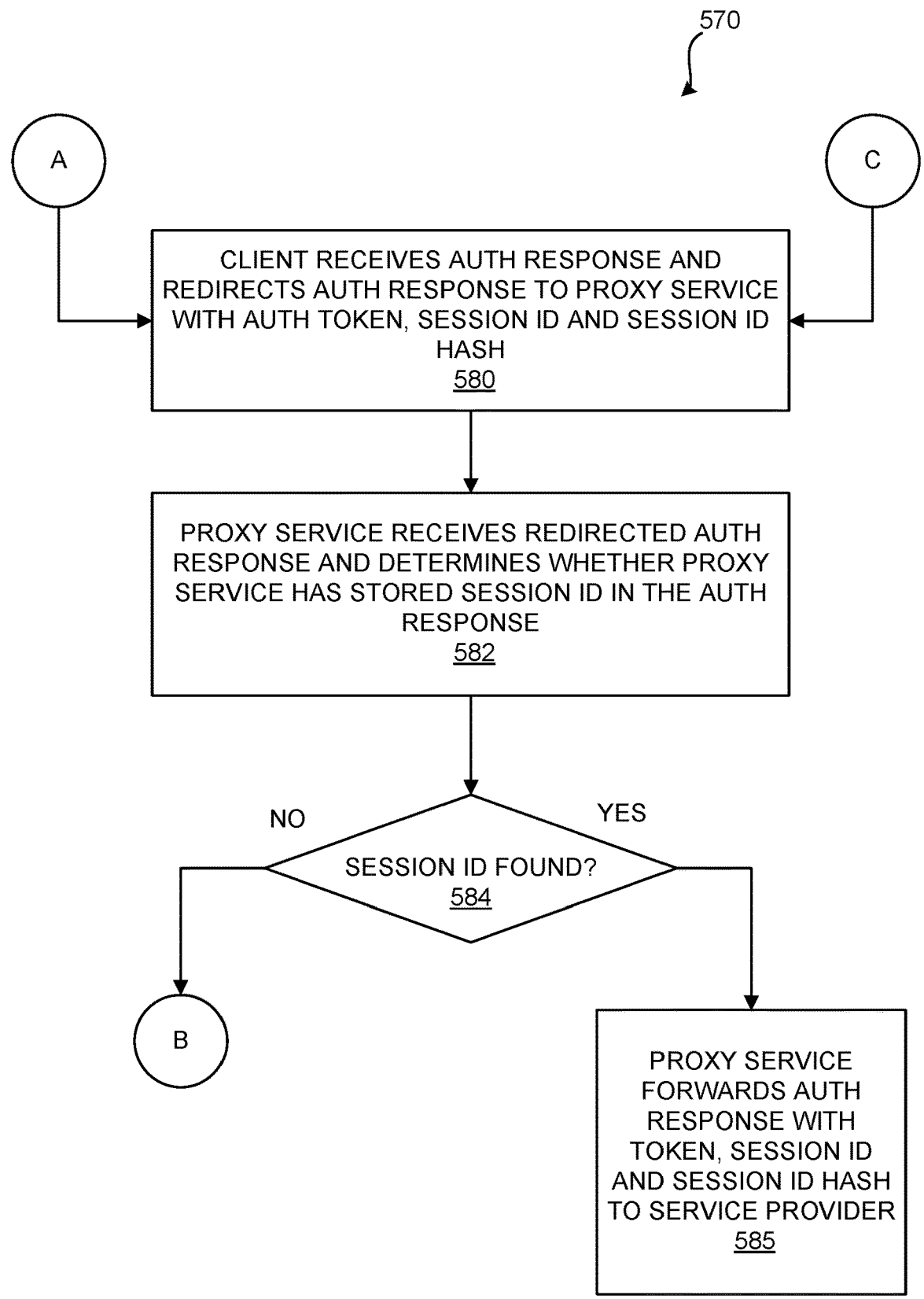
FIG. 5F is a flow diagram showing additional portions of the process of FIG. 5E.
Figure 5G:
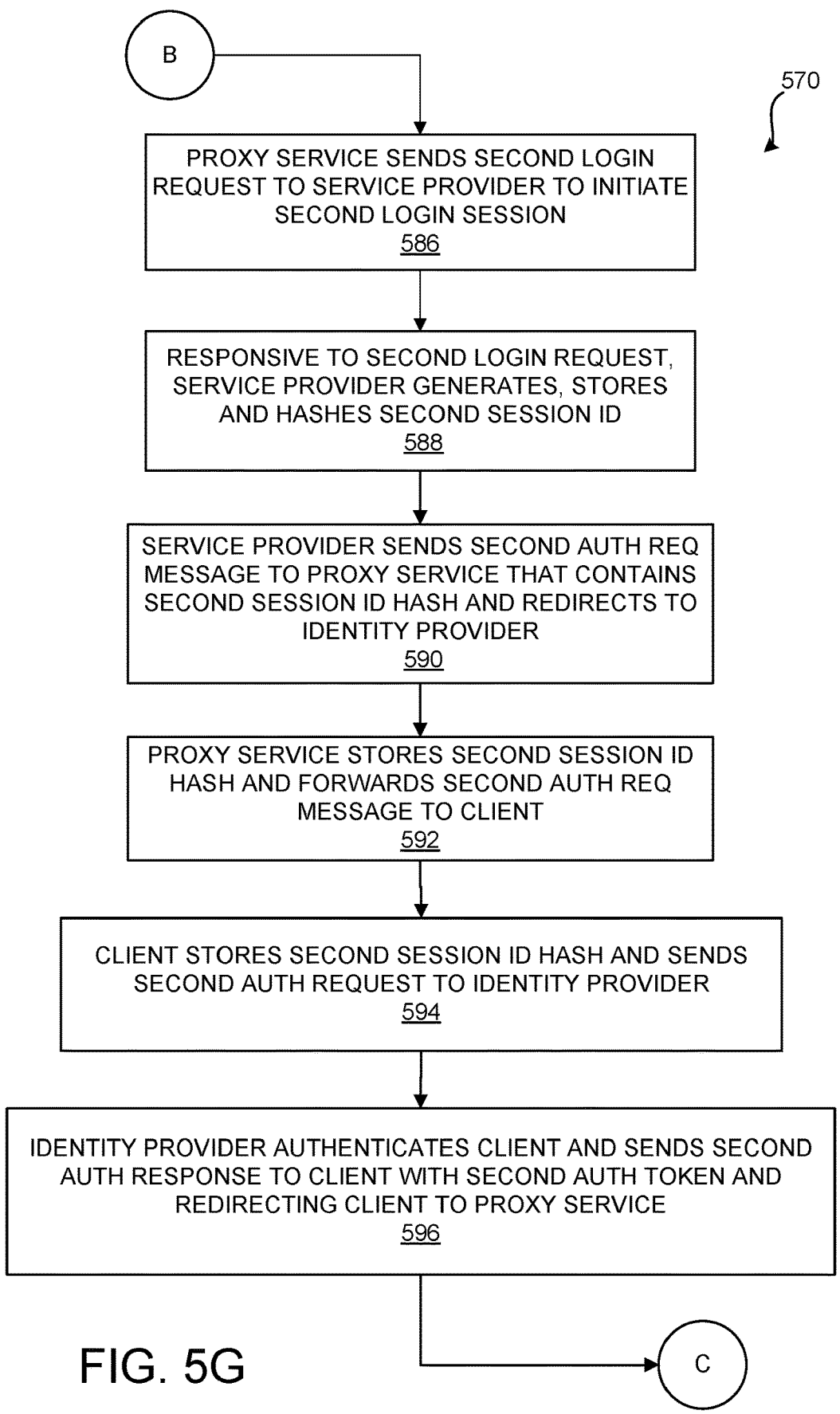
FIG. 5G is a flow diagram showing other additional portions of the process of FIG. 5E.

FIGS. 5E, 5F and 5G are control flow diagrams illustrating another example of a process 570 for performing SSO authentication in a system with a reverse proxy service in accordance with certain aspects of the disclosed technology.

In process 570, at 572, a client sends a first login request to a service provider to initiate a first login session. At 572, in response to the first login request, the service provider generates, stores and hashes and first nonce. At 574, the service provider sends a message to the client that contains the first session identifier and session identifier hash and redirects the client to an identity provider.

At 575, the client stores the first nonce and sends the first authentication request to an identity provider. At 576, identity provider authenticates the client, generates a first authentication token, and sends the first authentication response to the client with the first authentication token and the first session identifier hash and redirecting the client to a proxy service. Control flow continues to 580 in FIG. 5F, where the client receives the first authentication response with the first authentication token from the identity provider and redirects the first authentication response to a reverse proxy service with the first authentication token and first session identifier.

At 582, the reverse proxy service receives the redirected authentication response from the client and determines whether it recognizes the session identifier within the received authentication response. If the reverse proxy service does not recognize the session identifier, then control branches at 584 to 586 in FIG. 5G, where the reverse proxy service initiates a second login session by sending a second login request to the service provider.

At 588, responsive to the second login request, the service provider generates, stores and hashes a second session identifier. At 590, the service provider sends a second authentication request message to the reverse proxy service that contains the second session identifier hash and redirects to the identity provider. At 592, the reverse proxy service stores the second session identifier and forwards the second authentication request message to the client.

At 594, the client stores the second nonce received in the redirection message and sends the second authentication request to the identity provider. At 596, the identity provider authenticates the client and sends a second authentication response with a second authentication token that redirects the client to the reverse proxy service.

Control returns to 580 in FIG. 5EF where the client receives the second authentication response and redirects the second authentication response with the second authentication token and the second session identifier and second identifier hash to the reverse proxy service. At 582, the reverse proxy service receives the second authentication response, which corresponds to the second login session, and determines whether it recognizes the session identifier in the authentication response redirected from the client.

Because the proxy server stored the second session identifier for the second login session previously at 592, the second session identifier is found by the reverse proxy service and control branches at 584 to 585 in FIG. 5F, where the reverse proxy service forwards the authentication response to the service provider the second authentication response with the second authentication token and second session identifier and second session identifier hash. Because the service provider is able to recognize the second session identifier, the service provider completes the second login session. Note that the first login session is not completed.

One of skill in the art will readily appreciate that a variety of approaches may be utilized for performing single-sign-on authentication with a reverse proxy service without departing from the scope of the disclosed technology.

By enabling single-sign-on authentication with a reverse proxy service, the disclosed technology facilitates the use of a unique session identifier, such as a nonce, to prevent replay attacks in a system that can also obtain the benefits of utilizing a reverse proxy service. Enabling the use of a unique session identifier improves the security of the computer system. Utilizing a reverse proxy service can also improve security, such as by facilitating Secure Sockets Layer (SSL) encryption, or lead to more effective resource utilization.

It is to be appreciated that while the embodiments disclosed herein have been presented primarily in the context of performing single-sign-on authentication with a reverse proxy service. The technologies disclosed herein can be similarly applied to other contexts where similar functionality is utilized to perform authentication with a reverse proxy service.

Figure 6:
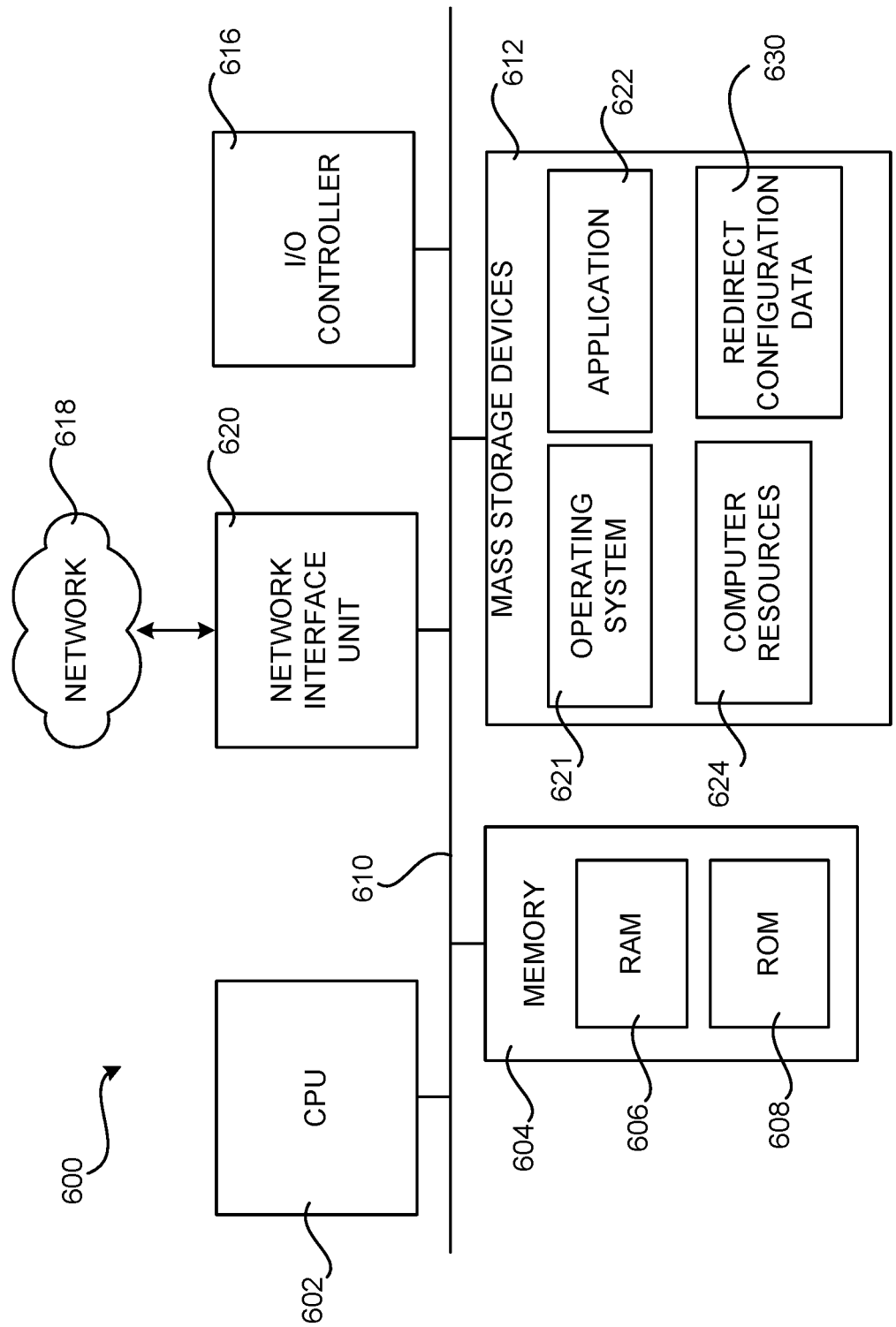
FIG. 6 is a computer architecture diagram showing an illustrative computer hardware and software architecture for a computing device, such as the computing devices shown in FIGS. 1 and 3, that can implement aspects of the technologies presented herein.

FIG. 6 is a computer architecture diagram that shows an architecture for a computer 600 capable of executing the software components described herein. The architecture illustrated in FIG. 6 is an architecture for a server computer, mobile phone, an e-reader, a smartphone, a desktop computer, a netbook computer, a tablet computer, a laptop computer, or another type of computing device suitable for executing the software components presented herein.

In this regard, it should be appreciated that the computer 600 shown in FIG. 6 can be utilized to implement a computing device capable of executing any of the software components presented herein. For example, and without limitation, the computing architecture described with reference to FIG. 6 can be utilized to implement the client 102, IdP 304, service provider 106 and reverse proxy service 308 illustrated in the system 100 of FIG. 3, which is capable of executing the various software components described above, such as the operations of the processes illustrated in FIGS. 5A-F.

The computer 600 illustrated in FIG. 6 includes a central processing unit 602 ("CPU"), a system memory 604, including a random-access memory 606 ("RAM") and a read-only memory ("ROM") 608, and a system bus 610 that couples the memory 604 to the CPU 602. A basic input/output system ("BIOS" or "firmware") containing the basic routines that help to transfer information between elements within the computer 600, such as during startup, is stored in the ROM 608. The computer 600 further includes one or more mass storage devices 612 for storing an operating system 621, application programs 622, and other types of programs and data including, but not limited to, the computer resources 624 and redirect configuration data 630. The computer resources 624 and redirect configuration data 630 can be stored in a different storage device from one another.

The mass storage device 612 is connected to the CPU 602 through a mass storage controller (not shown) connected to the bus 610. The mass storage device 612 and its associated computer readable media provide non-volatile storage for the computer 600. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer executable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 600. For purposes of the claims, the phrase "computer storage medium," and variations thereof, does not include waves or signals per se or communication media.

According to various configurations, the computer 600 can operate in a networked environment using logical connections to remote computers through a network such as the network 618. The computer 600 can connect to the network 618 through a network interface unit 620 connected to the bus 610. It should be appreciated that the network interface unit 620 can also be utilized to connect to other types of networks and remote computer systems. The computer 600 can also include an input/output controller 616 for receiving and processing input from a number of other devices, including a keyboard, mouse, touch input, or electronic stylus (not shown in FIG. 6). Similarly, the input/output controller 616 can provide output to a display screen or other type of output device (also not shown in FIG. 6).

It should be appreciated that the software components described herein, when loaded into the CPU 602 and executed, can transform the CPU 602 and the overall computer 600 from a general-purpose computing device into a special-purpose computing device customized to facilitate the functionality presented herein. The CPU 602 can be constructed from any number of transistors or other discrete circuit elements, which can individually or collectively assume any number of states. More specifically, the CPU 602 can operate as a finite-state machine, in response to executable instructions contained within the software modules disclosed herein. These computer executable instructions can transform the CPU 602 by specifying how the CPU 602 transitions between states, thereby transforming the transistors or other discrete hardware elements constituting the CPU 602.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 600 in order to store and execute the software components presented herein. It also should be appreciated that the architecture shown in FIG. 6 for the computer 600, or a similar architecture, can be utilized to implement other types of computing devices, including hand-held computers, video game devices, embedded computer systems, mobile devices such as smartphones and tablets, and other types of computing devices known to those skilled in the art. It is also contemplated that the computer 600 might not include all of the components shown in FIG. 6, can include other components that are not explicitly shown in FIG. 6, or can utilize an architecture completely different than that shown in FIG. 6.

Figure 7:
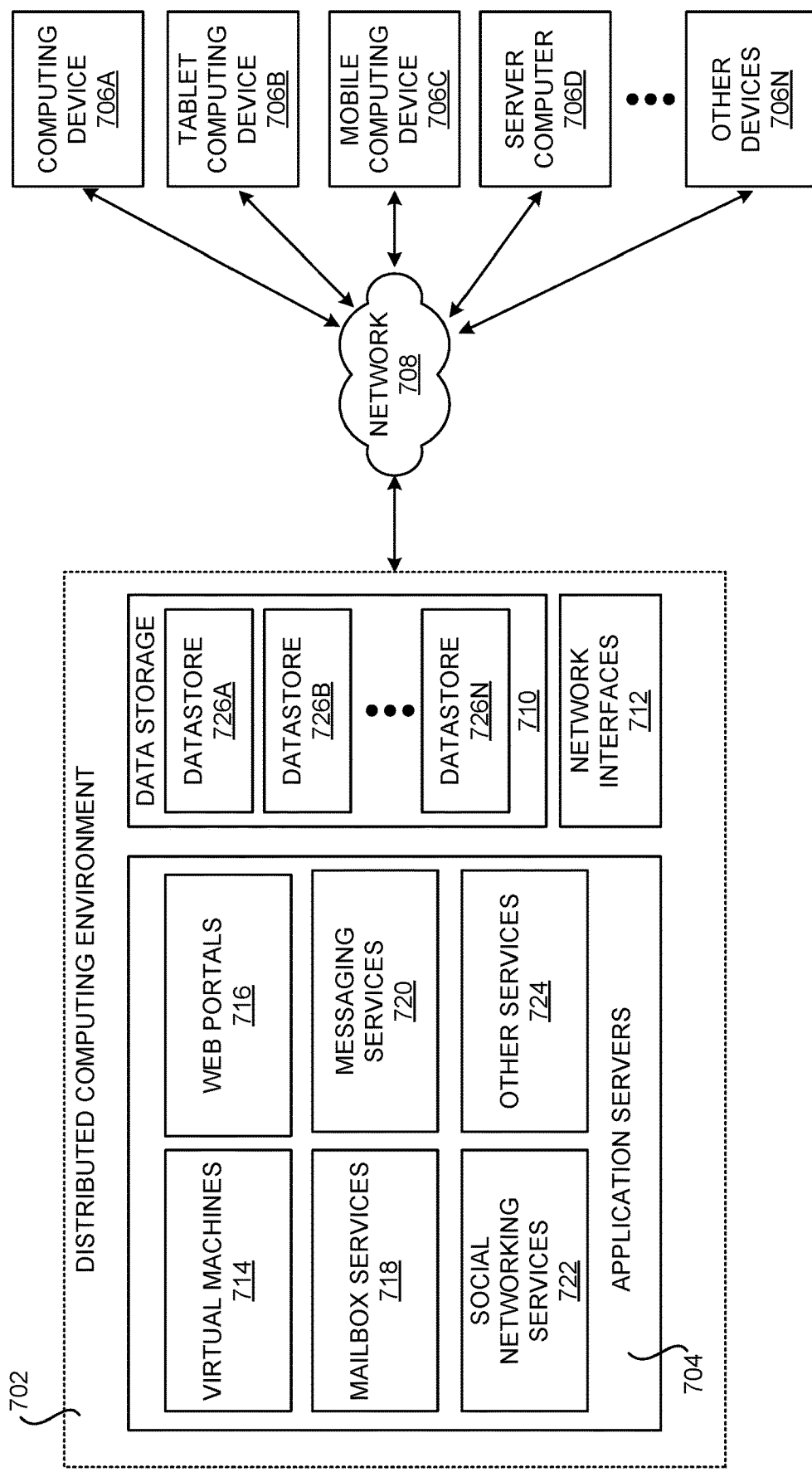
FIG. 7 is a network diagram illustrating a distributed computing environment capable of implementing aspects of the technologies presented herein.

FIG. 7 shows aspects of an illustrative distributed computing environment 702 that can provide cloud sourced resources, such as the resources for IdP 304, service provider 106 and reverse proxy service 308 of FIG. 3, in which the software components described herein can be executed. Thus, the distributed computing environment 702 illustrated in FIG. 7 can be used to execute program code capable of providing the functionality described above with respect to FIGS. 1-5 and/or any of the other software components described herein.

According to various implementations, the distributed computing environment 702 operates on, in communication with, or as part of a network 708. One or more client devices 706A-706N (hereinafter referred to collectively and/or generically as "devices 706") can communicate with the distributed computing environment 702 via the network 708 and/or other connections (not illustrated in FIG. 7).

In the illustrated configuration, the devices 706 include: a computing device 706A such as a laptop computer, a desktop computer, or other computing device; a "slate" or tablet computing device ("tablet computing device") 706B; a mobile computing device 706C such as a mobile telephone, a smartphone, or other mobile computing device; a server computer 706D; and/or other devices 706N. It should be understood that any number of devices 706 can communicate with the distributed computing environment 702. Two example computing architectures for the devices 706 are illustrated and described herein with reference to FIGS. 6 and 8. It should be understood that the illustrated client devices 706 and computing architectures illustrated and described herein are illustrative and should not be construed as being limited in any way.

In the illustrated configuration, the distributed computing environment 702 includes application servers 704, data storage 710, and one or more network interfaces 712. According to various implementations, the functionality of the application servers 704 can be provided by one or more server computers that are executing as part of, or in communication with, the network 708. The application servers 704 can host various services such as virtual machines, portals, and/or other resources. In the illustrated configuration, the application servers 704 host one or more virtual machines 714 for hosting applications, such as program components for implementing the functionality described above with regard to FIGS. 1-5. It should be understood that this configuration is illustrative and should not be construed as being limiting in any way. The application servers 704 might also host or provide access to one or more web portals, link pages, websites, and/or other information ("web portals") 716.

According to various implementations, the application servers 704 also include one or more mailbox services 718 and one or more messaging services 720. The mailbox services 718 can include electronic mail ("email") services. The mailbox services 718 can also include various personal information management ("PIM") services including, but not limited to, calendar services, contact management services, collaboration services, and/or other services. The messaging services 720 can include, but are not limited to, instant messaging ("IM") services, chat services, forum services, and/or other communication services.

The application servers 704 can also include one or more social networking services 722. The social networking services 722 can provide various types of social networking services including, but not limited to, services for sharing or posting status updates, instant messages, links, photos, videos, and/or other information, services for commenting or displaying interest in articles, products, blogs, or other resources, and/or other services. In some configurations, the social networking services 722 are provided by or include the FACEBOOK social networking service, the LINKEDIN professional networking service, the FOURSQUARE geographic networking service, and the like. In other configurations, the social networking services 722 are provided by other services, sites, and/or providers that might be referred to as "social networking providers." For example, some websites allow users to interact with one another via email, chat services, and/or other means during various activities and/or contexts such as reading published articles, commenting on goods or services, publishing, collaboration, gaming, and the like. Other services are possible and are contemplated.

The social network services 722 can include commenting, blogging, and/or microblogging services. Examples of such services include, but are not limited to, the YELP commenting service, the KUDZU review service, the OFFICETALK enterprise microblogging service, the TWITTER messaging service, and/or other services. It should be appreciated that the above lists of services are not exhaustive and that numerous additional and/or alternative social networking services 722 are not mentioned herein for the sake of brevity. As such, the configurations described above are illustrative, and should not be construed as being limited in any way.

As also shown in FIG. 7, the application servers 704 can also host other services, applications, portals, and/or other resources ("other services") 724. These services can include, but are not limited to, streaming video services like the NETFLIX streaming video service and productivity services such as the GMAIL email service from GOOGLE INC. It thus can be appreciated that activities performed by users of the distributed computing environment 702 can include various mailbox, messaging, social networking, group conversation, productivity, entertainment, and other types of activities. Use of these services, and others, can be detected and used to customize the operation of a computing device utilizing the technologies disclosed herein.

As mentioned above, the distributed computing environment 702 can include data storage 710. According to various implementations, the functionality of the data storage 710 is provided by one or more databases operating on, or in communication with, the network 708. The functionality of the data storage 710 can also be provided by one or more server computers configured to host data for the distributed computing environment 702. The data storage 710 can include, host, or provide one or more real or virtual datastores 726A-726N (hereinafter referred to collectively and/or generically as "datastores 726"). The datastores 726 are configured to host data used or created by the application servers 704 and/or other data.

The distributed computing environment 702 can communicate with, or be accessed by, the network interfaces 712. The network interfaces 712 can include various types of network hardware and software for supporting communications between two or more computing devices including, but not limited to, the devices 706 and the application servers 704. It should be appreciated that the network interfaces 712 can also be utilized to connect to other types of networks and/or computer systems.

It should be understood that the distributed computing environment 702 described herein can implement any aspects of the software elements described herein with any number of virtual computing resources and/or other distributed computing functionality that can be configured to execute any aspects of the software components disclosed herein. It should also be understood that the devices 706 can also include real or virtual machines including, but not limited to, server computers, web servers, personal computers, gaming consoles or other types of gaming devices, mobile computing devices, smartphones, and/or other devices. As such, various implementations of the technologies disclosed herein enable any device configured to access the distributed computing environment 702 to utilize the functionality described herein.

Figure 8:
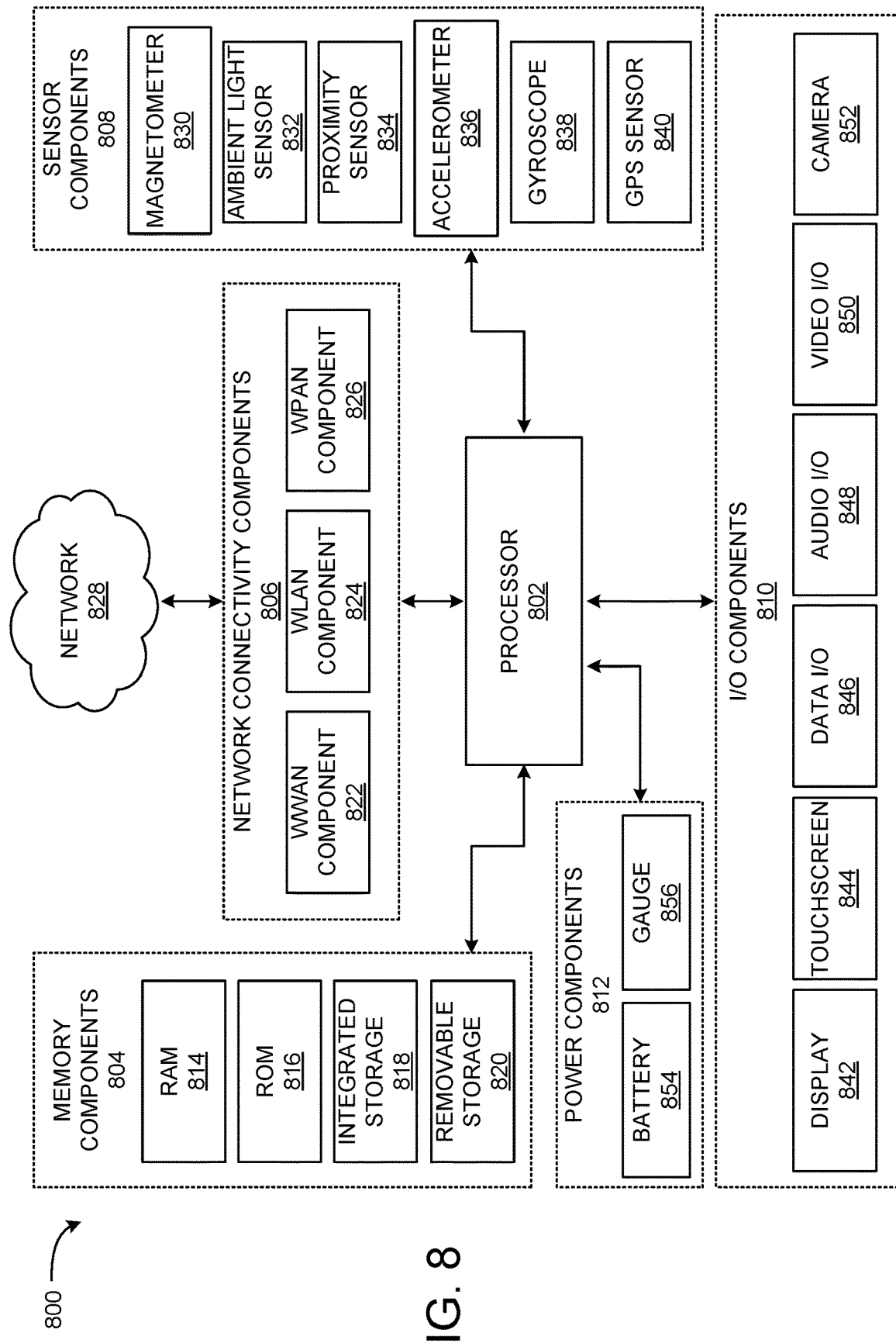
FIG. 8 is a computer architecture diagram illustrating a computing device architecture for a computing device, such as the computing devices shown in FIGS. 1 and 3, that is capable of implementing aspects of the technologies presented herein.

Turning now to FIG. 8, an illustrative computing device architecture 800 will be described for a computing device, such as the client 102, IdP 304, service provider 106 and reverse proxy service 308 illustrated in the system 100 of FIG. 3, that is capable of executing the various software components described herein. The computing device architecture 800 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like.

The computing device architecture 800 is also applicable to any of the devices 706 shown in FIG. 7. Furthermore, aspects of the computing device architecture 800 are applicable to traditional desktop computers, portable computers (e.g., laptops, notebooks, ultra-portables, and netbooks), server computers, and other computer devices, such as those described herein. For example, the single touch and multi-touch aspects disclosed herein below can be applied to desktop, laptop, convertible, smartphone, or tablet computer devices that utilize a touchscreen or some other touch-enabled device, such as a touch-enabled track pad or touch-enabled mouse. The computing device architecture 800 can also be utilized to implement the client 102, IdP 304, service provider 106 and reverse proxy service 308 illustrated in the system 100 of FIG. 3 and/or other types of computing devices for implementing or consuming the functionality described herein.

The computing device architecture 800 illustrated in FIG. 8 includes a processor 802, memory components 804, network connectivity components 806, sensor components 808, input/output components 810, and power components 812. In the illustrated configuration, the processor 802 is in communication with the memory components 804, the network connectivity components 806, the sensor components 808, the input/output ("I/O") components 810, and the power components 812. Although no connections are shown between the individual components illustrated in FIG. 8, the components can be connected electrically in order to interact and carry out device functions. In some configurations, the components are arranged so as to communicate via one or more busses (not shown).

The processor 802 includes one or more CPU cores configured to process data, execute computer executable instructions of one or more application programs and to communicate with other components of the computing device architecture 800 in order to perform various functionality described herein. The processor 802 can be utilized to execute aspects of the software components presented herein and, particularly, those that utilize, at least in part, a touch-enabled input.

In some configurations, the processor 802 includes a graphics processing unit ("GPU") configured to accelerate operations performed by the CPU, including, but not limited to, operations performed by executing general-purpose scientific and engineering computing applications, as well as graphics-intensive computing applications such as high-resolution video (e.g., 720P, 1080P, 4K, and greater), video games, 3D modeling applications, and the like. In some configurations, the processor 802 is configured to communicate with a discrete GPU (not shown). In any case, the CPU and GPU can be configured in accordance with a co-processing CPU/GPU computing model, wherein the sequential part of an application executes on the CPU and the computationally intensive part is accelerated by the GPU.

In some configurations, the processor 802 is, or is included in, a system-on-chip ("SoC") along with one or more of the other components described herein below. For example, the SoC can include the processor 802, a GPU, one or more of the network connectivity components 806, and one or more of the sensor components 808. In some configurations, the processor 802 is fabricated, in part, utilizing a package-on-package ("PoP") integrated circuit packaging technique. Moreover, the processor 802 can be a single core or multi-core processor.

The processor 802 can be created in accordance with an ARM architecture, available for license from ARM HOLDINGS of Cambridge, United Kingdom. Alternatively, the processor 802 can be created in accordance with an x86 architecture, such as is available from INTEL CORPORATION of Mountain View, Calif. and others. In some configurations, the processor 802 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 804 include a RAM 814, a ROM 816, an integrated storage memory ("integrated storage") 818, and a removable storage memory ("removable storage") 820. In some configurations, the RAM 814 or a portion thereof, the ROM 816 or a portion thereof, and/or some combination of the RAM 814 and the ROM 816 is integrated in the processor 802. In some configurations, the ROM 816 is configured to store a firmware, an operating system or a portion thereof (e.g., operating system kernel), and/or a bootloader to load an operating system kernel from the integrated storage 818 or the removable storage 820.

The integrated storage 818 can include a solid-state memory, a hard disk, or a combination of solid-state memory and a hard disk. The integrated storage 818 can be soldered or otherwise connected to a logic board upon which the processor 802 and other components described herein might also be connected. As such, the integrated storage 818 is integrated in the computing device. The integrated storage 818 can be configured to store an operating system or portions thereof, application programs, data, and other software components described herein.

The removable storage 820 can include a solid-state memory, a hard disk, or a combination of solid-state memory and a hard disk. In some configurations, the removable storage 820 is provided in lieu of the integrated storage 818. In other configurations, the removable storage 820 is provided as additional optional storage. In some configurations, the removable storage 820 is logically combined with the integrated storage 818 such that the total available storage is made available and shown to a user as a total combined capacity of the integrated storage 818 and the removable storage 820.

The removable storage 820 is configured to be inserted into a removable storage memory slot (not shown) or other mechanism by which the removable storage 820 is inserted and secured to facilitate a connection over which the removable storage 820 can communicate with other components of the computing device, such as the processor 802. The removable storage 820 can be embodied in various memory card formats including, but not limited to, PC card, COMPACTFLASH card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 804 can store an operating system. According to various configurations, the operating system includes, but is not limited to, the WINDOWS operating system from MICROSOFT CORPORATION, the IOS operating system from APPLE INC. of Cupertino, Calif., and ANDROID operating system from GOOGLE INC. of Mountain View, Calif. Other operating systems can also be utilized.

The network connectivity components 806 include a wireless wide area network component ("WWAN component") 822, a wireless local area network component ("WLAN component") 824, and a wireless personal area network component ("WPAN component") 826. The network connectivity components 806 facilitate communications to and from a network 828, which can be a WWAN, a WLAN, or a WPAN. Although a single network 828 is illustrated, the network connectivity components 806 can facilitate simultaneous communication with multiple networks. For example, the network connectivity components 806 can facilitate simultaneous communications with multiple networks via one or more of a WWAN, a WLAN, or a WPAN.

The network 828 can be a WWAN, such as a mobile telecommunications network utilizing one or more mobile telecommunications technologies to provide voice and/or data services to a computing device utilizing the computing device architecture 800 via the WWAN component 822. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX").

Moreover, the network 828 can utilize various channel access methods (which might or might not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications can be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 828 can be configured to provide voice and/or data communications with any combination of the above technologies. The network 828 can be configured or adapted to provide voice and/or data communications in accordance with future generation technologies.

In some configurations, the WWAN component 822 is configured to provide dual-multi-mode connectivity to the network 828. For example, the WWAN component 822 can be configured to provide connectivity to the network 828, wherein the network 828 provides service via GSM and UMTS technologies, or via some other combination of technologies. Alternatively, multiple WWAN components 822 can be utilized to perform such functionality, and/or provide additional functionality to support other non-compatible technologies (i.e., incapable of being supported by a single WWAN component). The WWAN component 822 can facilitate similar connectivity to multiple networks (e.g., a UMTS network and an LTE network).

The network 828 can be a WLAN operating in accordance with one or more Institute of Electrical and Electronic Engineers ("IEEE") 104.11 standards, such as IEEE 104.11a, 104.11b, 104.11g, 104.11n, and/or a future 104.11 standard (referred to herein collectively as WI-FI). Draft 104.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 824 is configured to connect to the network 828 via the WI-FI access points. Such connections can be secured via various encryption technologies including, but not limited, WI-FI Protected Access ("WPA"), WPA2, Wired Equivalent Privacy ("WEP"), and the like.

The network 828 can be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 826 is configured to facilitate communications with other devices, such as peripherals, computers, or other computing devices via the WPAN.

The sensor components 808 include a magnetometer 830, an ambient light sensor 832, a proximity sensor 834, an accelerometer 836, a gyroscope 838, and a Global Positioning System sensor ("GPS sensor") 840. It is contemplated that other sensors, such as, but not limited to, temperature sensors or shock detection sensors, might also be incorporated in the computing device architecture 800.

The magnetometer 830 is configured to measure the strength and direction of a magnetic field. In some configurations, the magnetometer 830 provides measurements to a compass application program stored within one of the memory components 804 in order to provide a user with accurate directions in a frame of reference including the cardinal directions, north, south, east, and west. Similar measurements can be provided to a navigation application program that includes a compass component. Other uses of measurements obtained by the magnetometer 830 are contemplated.

The ambient light sensor 832 is configured to measure ambient light. In some configurations, the ambient light sensor 832 provides measurements to an application program stored within one the memory components 804 in order to automatically adjust the brightness of a display (described below) to compensate for low light and bright light environments. Other uses of measurements obtained by the ambient light sensor 832 are contemplated.

The proximity sensor 834 is configured to detect the presence of an object or thing in proximity to the computing device without direct contact. In some configurations, the proximity sensor 834 detects the presence of a user's body (e.g., the user's face) and provides this information to an application program stored within one of the memory components 804 that utilizes the proximity information to enable or disable some functionality of the computing device. For example, a telephone application program can automatically disable a touchscreen (described below) in response to receiving the proximity information so that the user's face does not inadvertently end a call or enable/disable other functionality within the telephone application program during the call. Other uses of proximity as detected by the proximity sensor 834 are contemplated.

The accelerometer 836 is configured to measure proper acceleration. In some configurations, output from the accelerometer 836 is used by an application program as an input mechanism to control some functionality of the application program. In some configurations, output from the accelerometer 836 is provided to an application program for use in switching between landscape and portrait modes, calculating coordinate acceleration, or detecting a fall. Other uses of the accelerometer 836 are contemplated.

The gyroscope 838 is configured to measure and maintain orientation. In some configurations, output from the gyroscope 838 is used by an application program as an input mechanism to control some functionality of the application program. For example, the gyroscope 838 can be used for accurate recognition of movement within a 3D environment of a video game application or some other application. In some configurations, an application program utilizes output from the gyroscope 838 and the accelerometer 836 to enhance user input operations. Other uses of the gyroscope 838 are contemplated.

The GPS sensor 840 is configured to receive signals from GPS satellites for use in calculating a location. The location calculated by the GPS sensor 840 can be used by any application program that requires or benefits from location information. For example, the location calculated by the GPS sensor 840 can be used with a navigation application program to provide directions from the location to a destination or directions from the destination to the location. Moreover, the GPS sensor 840 can be used to provide location information to an external location-based service, such as E911 service. The GPS sensor 840 can obtain location information generated via WI-FI, WIMAX, and/or cellular triangulation techniques utilizing one or more of the network connectivity components 806 to aid the GPS sensor 840 in obtaining a location fix. The GPS sensor 840 can also be used in Assisted GPS ("A-GPS") systems.

The I/O components 810 include a display 842, a touchscreen 844, a data I/O interface component ("data I/O") 846, an audio I/O interface component ("audio I/O") 848, a video I/O interface component ("video I/O") 850, and a camera 852. In some configurations, the display 842 and the touchscreen 844 are combined. In some configurations two or more of the data I/O component 846, the audio I/O component 848, and the video I/O component 850 are combined. The I/O components 810 can include discrete processors configured to support the various interfaces described below or might include processing functionality built-in to the processor 802.

The display 842 is an output device configured to present information in a visual form. In particular, the display 842 can present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 842 is a liquid crystal display ("LCD") utilizing any active or passive matrix technology and any backlighting technology (if used). In some configurations, the display 842 is an organic light emitting diode ("OLED") display. Other display types are contemplated.

The touchscreen 844 is an input device configured to detect the presence and location of a touch. The touchscreen 844 can be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or can utilize any other touchscreen technology. In some configurations, the touchscreen 844 is incorporated on top of the display 842 as a transparent layer to enable a user to use one or more touches to interact with objects or other information presented on the display 842. In other configurations, the touchscreen 844 is a touch pad incorporated on a surface of the computing device that does not include the display 842. For example, the computing device can have a touchscreen incorporated on top of the display 842 and a touch pad on a surface opposite the display 842.

In some configurations, the touchscreen 844 is a single-touch touchscreen. In other configurations, the touchscreen 844 is a multi-touch touchscreen. In some configurations, the touchscreen 844 is configured to detect discrete touches, single touch gestures, and/or multi-touch gestures. These are collectively referred to herein as "gestures" for convenience. Several gestures will now be described. It should be understood that these gestures are illustrative and are not intended to limit the scope of the appended claims. Moreover, the described gestures, additional gestures, and/or alternative gestures can be implemented in software for use with the touchscreen 844. As such, a developer can create gestures that are specific to a particular application program.

In some configurations, the touchscreen 844 supports a tap gesture in which a user taps the touchscreen 844 once on an item presented on the display 842. The tap gesture can be used for various reasons including, but not limited to, opening or launching whatever the user taps, such as a graphical icon. In some configurations, the touchscreen 844 supports a double tap gesture in which a user taps the touchscreen 844 twice on an item presented on the display 842. The double tap gesture can be used for various reasons including, but not limited to, zooming in or zooming out in stages. In some configurations, the touchscreen 844 supports a tap and hold gesture in which a user taps the touchscreen 844 and maintains contact for at least a pre-defined time. The tap and hold gesture can be used for various reasons including, but not limited to, opening a context-specific menu.

In some configurations, the touchscreen 844 supports a pan gesture in which a user places a finger on the touchscreen 844 and maintains contact with the touchscreen 844 while moving the finger on the touchscreen 844. The pan gesture can be used for various reasons including, but not limited to, moving through screens, images, or menus at a controlled rate. Multiple finger pan gestures are also contemplated. In some configurations, the touchscreen 844 supports a flick gesture in which a user swipes a finger in the direction the user wants the screen to move. The flick gesture can be used for various reasons including, but not limited to, scrolling horizontally or vertically through menus or pages. In some configurations, the touchscreen 844 supports a pinch and stretch gesture in which a user makes a pinching motion with two fingers (e.g., thumb and forefinger) on the touchscreen 844 or moves the two fingers apart. The pinch and stretch gesture can be used for various reasons including, but not limited to, zooming gradually in or out of a website, map, or picture.

Although the gestures described above have been presented with reference to the use of one or more fingers for performing the gestures, other appendages such as toes or objects such as styluses can be used to interact with the touchscreen 844. As such, the above gestures should be understood as being illustrative and should not be construed as being limiting in any way.

The data I/O interface component 846 is configured to facilitate input of data to the computing device and output of data from the computing device. In some configurations, the data I/O interface component 846 includes a connector configured to provide wired connectivity between the computing device and a computer system, for example, for synchronization operation purposes. The connector can be a proprietary connector or a standardized connector such as USB, micro-USB, mini-USB, USB-C, or the like. In some configurations, the connector is a dock connector for docking the computing device with another device such as a docking station, audio device (e.g., a digital music player), or video device.

The audio I/O interface component 848 is configured to provide audio input and/or output capabilities to the computing device. In some configurations, the audio I/O interface component 848 includes a microphone configured to collect audio signals. In some configurations, the audio I/O interface component 848 includes a headphone jack configured to provide connectivity for headphones or other external speakers. In some configurations, the audio interface component 848 includes a speaker for the output of audio signals. In some configurations, the audio I/O interface component 848 includes an optical audio cable out.

The video I/O interface component 850 is configured to provide video input and/or output capabilities to the computing device. In some configurations, the video I/O interface component 850 includes a video connector configured to receive video as input from another device (e.g., a video media player such as a DVD or BLU-RAY player) or send video as output to another device (e.g., a monitor, a television, or some other external display). In some configurations, the video I/O interface component 850 includes a High-Definition Multimedia Interface ("HDMI"), mini-HDMI, micro-HDMI, DisplayPort, or proprietary connector to input/output video content. In some configurations, the video I/O interface component 850 or portions thereof is combined with the audio I/O interface component 848 or portions thereof.

The camera 852 can be configured to capture still images and/or video. The camera 852 can utilize a charge coupled device ("CCD") or a complementary metal oxide semiconductor ("CMOS") image sensor to capture images. In some configurations, the camera 852 includes a flash to aid in taking pictures in low-light environments. Settings for the camera 852 can be implemented as hardware or software buttons.

Although not illustrated, one or more hardware buttons can also be included in the computing device architecture 800. The hardware buttons can be used for controlling some operational aspect of the computing device. The hardware buttons can be dedicated buttons or multi-use buttons. The hardware buttons can be mechanical or sensor-based.

The illustrated power components 812 include one or more batteries 854, which can be connected to a battery gauge 856. The batteries 854 can be rechargeable or disposable. Rechargeable battery types include, but are not limited to, lithium polymer, lithium ion, nickel cadmium, and nickel metal hydride. Each of the batteries 854 can be made of one or more cells.

The battery gauge 856 can be configured to measure battery parameters such as current, voltage, and temperature. In some configurations, the battery gauge 856 is configured to measure the effect of a battery's discharge rate, temperature, age and other factors to predict remaining life within a certain percentage of error. In some configurations, the battery gauge 856 provides measurements to an application program that is configured to utilize the measurements to present useful power management data to a user. Power management data can include one or more of a percentage of battery used, a percentage of battery remaining, a battery condition, a remaining time, a remaining capacity (e.g., in watt hours), a current draw, and a voltage.

The power components 812 can also include a power connector (not shown), which can be combined with one or more of the aforementioned I/O components 810. The power components 812 can interface with an external power system or charging equipment via a power I/O component 810. Other configurations can also be utilized.

The disclosure presented herein also encompasses the subject matter set forth in the following clauses:

Clause 1. A computer-implemented method for performing single-sign-on authentication in a system with a reverse proxy service, the method comprising: sending a first login request from a client to a service provider to initiate a first login session; responsive to the first login request, in the service provider, generating a first unique session identifier, storing the first unique session identifier, and hashing the first unique session identifier to create a first session identifier hash; sending a first authentication request message from the service provider to the client that contains the first session identifier and the first session identifier hash and redirects the first authentication request message to an identity provider; responsive to the first authentication request message, in the client, storing the first session identifier and sending a first authentication request to the identity provider; in the identity provider, authenticating the client responsive to the first authentication request, generating a first authentication token, and sending a first authentication response to the client with the first authentication token and redirecting the client to a proxy service; in the client, receiving the first authentication response with the first authentication token and redirecting the first authentication response to the proxy service with the first session identifier; in the proxy service, receiving the first authentication response and determining whether the first session identifier is stored on the proxy service; if the first session identifier is not stored on the proxy service, in the proxy service, sending a second login request to the service provider to initiate a second login session; responsive to the second login request, in the service provider, generating a second unique session identifier, storing the second unique session identifier, and hashing the second unique session identifier to create a second session identifier hash; sending a second authentication request message from the service provider to the proxy service that contains the second session identifier and the second session identifier hash and redirects the second authentication request message to the identity provider; in the proxy service, storing the second session identifier and sending the second authentication request message to the client; in the client, storing the second session identifier and sending the second authentication request message to the identity provider; in the identity provider, authenticating the client responsive to the second authentication request, generating a second authentication token, and sending a second authentication response to the client with the second authentication token and redirecting the client to the proxy service; in the client, receiving the second authentication response with the second authentication token and redirecting the second authentication response to the proxy service with the second session identifier; in the proxy service, receiving the second authentication response and determining whether the second session identifier is stored on the proxy service; and if the second session identifier is stored on the proxy service, in the proxy service, sending the second authentication response to the service provider to complete the second login session.

Clause 2. The computer-implemented method of Clause 1, where the session identifier comprises a first nonce and the second session identifier comprises a second nonce.

Clause 3. The computer-implemented method of Clause 1, where the second login request includes service provider context data that matches service provider context data in the first login request.

Clause 4. The computer-implemented method of Clause 1, where the step of authenticating the client responsive to the first authentication request, generating a first authentication token, and sending a first authentication response to client with the first authentication token and redirecting the client to a proxy service includes using proxy configuration data to identify the proxy service.

Clause 5. The computer-implemented method of Clause 4, where one or more parameters included in the first authentication request are utilized to identify the proxy service.

Clause 6. The computer-implemented method of Clause 1, where the proxy service comprises a suffix proxy service and identifying data for the suffix proxy service is appended to a universal resource corresponding to the service provider.

Clause 7. A reverse proxy system with single-sign-on authentication capability, the system comprising: a proxy service having one or more processors and at least one computer storage medium having computer executable instructions stored thereon which, when executed by the one or more processors, cause the one or more processors to: receive an authentication response message from a client that includes an authentication token and a unique session identifier; determine whether the unique session identifier in the authentication response message received from the client is stored on the proxy service; if the unique session identifier in the authentication response message received from the client is stored on the proxy service, send the authentication response message with the authentication token and the unique session identifier to a service provider to which the authentication response message is directed; and if the unique session identifier in the authentication response message received from the client is not stored on the proxy service: send a login request message to the service provider to which the authentication response message is directed, receive an authentication request message from the service provider that includes an other unique session identifier and redirects the authentication request message to an identity provider, store the other unique session identifier on the proxy service, and send the authentication request message with the other unique session identifier to the client.

Clause 8. The reverse proxy system of Clause 7, the system including the identity provider, the identity provider having one or more processors and at least one computer storage medium having computer executable instructions stored thereon which, when executed by the one or more processors, cause the one or more processors to: receive an authentication request message from the client; authenticate user credentials included in the authentication request message from the client and generate an authentication token; determine whether a proxy service redirect is defined that is relevant to the authentication request message from the client and that identifies the proxy service for redirect; if the proxy service redirect is defined that is relevant to the authentication request message from the client, generate an authentication response message that is configured to redirect to the proxy service and includes the generated authentication token; and send the authentication response message that is configured to redirect to the proxy service and includes the generated authentication token to the client.

Clause 9. The reverse proxy system of Clause 8, where one or more parameters included in the authentication request received by the identity provider from the client are utilized by the identity provider to determine whether a proxy service redirect is defined that is relevant to the authentication request message from the client.

Clause 10. The reverse proxy system of Clause 7, where the unique session identifier comprises a first nonce and the other unique session identifier comprises a second nonce.

Clause 11. The reverse proxy system of Clause 7, where the client and the service provider are configured to operate in accordance with a predefined authentication protocol and the proxy service is configured to communicate with the client and the service provider in accordance with the predefined authentication protocol, such that the client device and service provider do not require operational modification from the predefined authentication protocol.

Clause 12. The reverse proxy system of Clause 7, where the proxy service comprises a suffix proxy service and identifying data for the suffix proxy service is appended to a universal resource locator corresponding to the service provider Clause 13. The reverse proxy system of Clause 7, where the login request message sent by the proxy service to the service provider to which the authentication response message is directed includes state data that matches state data in the authentication response message.

Clause 14. One or more computer storage media having computer executable instructions stored thereon which, when executed by one or more processors, cause the processors to execute a method for single-sign-on authentication in a reverse proxy system, the method comprising, in a proxy service: receiving an authentication response message from a client that includes an authentication token and a unique session identifier; determining whether the unique session identifier in the authentication response message received from the client is stored on the proxy service; if the unique session identifier in the authentication response message received from the client is stored on the proxy service, sending the authentication response message with the authentication token and the unique session identifier to a service provider to which the authentication response message is directed; and if the unique session identifier in the authentication response message received from the client is not stored on the proxy service: sending a login request message to the service provider to which the authentication response message is directed, receiving an authentication request message from the service provider that includes an other unique session identifier and redirects the authentication request message to an identity provider, storing the other unique session identifier on the proxy service, and sending the authentication request message with the other unique session identifier to the client.

Clause 15. The computer storage media of Clause 14, the system including the identity provider, the identity provider having one or more processors and at least one computer storage medium having computer executable instructions stored thereon which, when executed by the one or more processors, cause the one or more processors to: receive an authentication request message from the client; authenticate user credentials included in the authentication request message from the client and generate an authentication token; determine whether a proxy service redirect is defined that is relevant to the authentication request message from the client and that identifies the proxy service for redirect; if the proxy service redirect is defined that is relevant to the authentication request message from the client, generate an authentication response message that is configured to redirect to the proxy service and includes the generated authentication token; and send the authentication response message that is configured to redirect to the proxy service and includes the generated authentication token to the client.

Clause 16. The computer storage media of Clause 15, where one or more parameters included in the authentication request received by the identity provider from the client are utilized by the identity provider to determine whether a proxy service redirect is defined that is relevant to the authentication request message from the client.

Clause 17. The computer storage media of Clause 14, where the unique session identifier comprises a first nonce and the other unique session identifier comprises a second nonce.

Clause 18. The computer storage media of Clause 14, where the client and the service provider are configured to operate in accordance with a predefined authentication protocol and the proxy service is configured to communicate with the client and the service provider in accordance with the predefined authentication protocol, such that the client device and service provider do not require operational modification from the predefined authentication protocol.

Clause 19. The computer storage media of Clause 14, where the proxy service comprises a suffix proxy service and identifying data for the suffix proxy service is appended to a universal resource locator corresponding to the service provider Clause 20. The computer storage media of Clause 14, where the login request message sent by the proxy service to the service provider to which the authentication response message is directed includes state data that matches state data in the authentication response message.

Based on the foregoing, it should be appreciated that the disclosed technology enables single-sign-on sessions in systems that utilize a reverse proxy service, which improves security by reducing vulnerability to replay attacks and improves security and efficiency through the use of a reverse proxy service. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method for performing single-sign-on authentication in a system with a reverse proxy service, the method comprising:
   sending a first login request from a client to a service provider to initiate a first login session;
   responsive to the first login request, in the service provider, generating a first unique session identifier, storing the first unique session identifier, and hashing the first unique session identifier to create a first session identifier hash;
   sending a first authentication request message from the service provider to the client that contains the first session identifier and the first session identifier hash and redirects the first authentication request message to an identity provider;
   responsive to the first authentication request message, in the client, storing the first session identifier and sending a first authentication request to the identity provider;
   in the identity provider, authenticating the client responsive to the first authentication request, generating a first authentication token, and sending a first authentication response to the client with the first authentication token and redirecting the client to a proxy service;
   in the client, receiving the first authentication response with the first authentication token and redirecting the first authentication response to the proxy service with the first session identifier;
   in the proxy service, receiving the first authentication response and determining whether the first session identifier is stored on the proxy service;
   if the first session identifier is not stored on the proxy service, in the proxy service, sending a second login request to the service provider to initiate a second login session;
   responsive to the second login request, in the service provider, generating a second unique session identifier, storing the second unique session identifier, and hashing the second unique session identifier to create a second session identifier hash;
   sending a second authentication request message from the service provider to the proxy service that contains the second session identifier and the second session identifier hash and redirects the second authentication request message to the identity provider;
   in the proxy service, storing the second session identifier and sending the second authentication request message to the client;
   in the client, storing the second session identifier and sending the second authentication request message to the identity provider;
   in the identity provider, authenticating the client responsive to the second authentication request, generating a second authentication token, and sending a second authentication response to the client with the second authentication token and redirecting the client to the proxy service;
   in the client, receiving the second authentication response with the second authentication token and redirecting the second authentication response to the proxy service with the second session identifier;
   in the proxy service, receiving the second authentication response and determining whether the second session identifier is stored on the proxy service; and if the second session identifier is stored on the proxy service, in the proxy service, sending the second authentication response to the service provider to complete the second login session.

2. The computer-implemented method of claim 1, where the session identifier comprises a first nonce and the second session identifier comprises a second nonce.

3. The computer-implemented method of claim 1, where the second login request includes service provider context data that matches service provider context data in the first login request.

4. The computer-implemented method of claim 1, where the step of authenticating the client responsive to the first authentication request, generating a first authentication token, and sending a first authentication response to client with the first authentication token and redirecting the client to a proxy service includes using proxy configuration data to identify the proxy service.

5. The computer-implemented method of claim 4, where one or more parameters included in the first authentication request are utilized to identify the proxy service.

6. The computer-implemented method of claim 1, where the proxy service comprises a suffix proxy service and identifying data for the suffix proxy service is appended to a universal resource corresponding to the service provider.

7. A reverse proxy system with single-sign-on authentication capability, the system comprising:
one or more processors; and
at least one computer storage medium having computer executable instructions stored thereon which, when executed by the one or more processors, cause the one or more processors to:
receive an authentication response message from a client that includes an authentication token and a unique session identifier;
determine whether the unique session identifier in the authentication response message received from the client is stored on a proxy service;
if the unique session identifier in the authentication response message received from the client is stored on the proxy service, send the authentication response message with the authentication token and the unique session identifier to a service provider to which the authentication response message is directed; and
if the unique session identifier in the authentication response message received from the client is not stored on the proxy service:
send a login request message to the service provider to which the authentication response message is directed,
receive an authentication request message from the service provider that includes an other unique session identifier and redirects the authentication request message to an identity provider,
store the other unique session identifier on the proxy service, and
send the authentication request message with the other unique session identifier to the client.

8. The reverse proxy system of claim 7, the system including the identity provider, the identity provider having one or more processors and at least one computer storage medium having computer executable instructions stored thereon which, when executed by the one or more processors, cause the one or more processors to:
receive an authentication request message from the client;
authenticate user credentials included in the authentication request message from the client and generate an authentication token;
determine whether a proxy service redirect is defined that is relevant to the authentication request message from the client and that identifies the proxy service for redirect;
if the proxy service redirect is defined that is relevant to the authentication request message from the client, generate an authentication response message that is configured to redirect to the proxy service and includes the generated authentication token; and
send the authentication response message that is configured to redirect to the proxy service and includes the generated authentication token to the client.

9. The reverse proxy system of claim 8, where one or more parameters included in the authentication request received by the identity provider from the client are utilized by the identity provider to determine whether a proxy service redirect is defined that is relevant to the authentication request message from the client.

10. The reverse proxy system of claim 7, where the unique session identifier comprises a first nonce and the other unique session identifier comprises a second nonce.

11. The reverse proxy system of claim 7, where the client and the service provider are configured to operate in accordance with a predefined authentication protocol and the proxy service is configured to communicate with the client and the service provider in accordance with the predefined authentication protocol, such that the client device and service provider do not require operational modification from the predefined authentication protocol.

12. The reverse proxy system of claim 7, where the proxy service comprises a suffix proxy service and identifying data for the suffix proxy service is appended to a universal resource locator corresponding to the service provider.

13. The reverse proxy system of claim 7, where the login request message sent by the proxy service to the service provider to which the authentication response message is directed includes state data that matches state data in the authentication response message.

14. One or more computer storage media having computer executable instructions stored thereon which, when executed by one or more processors, cause the processors to execute a method for single-sign-on authentication in a reverse proxy system, the method comprising, in a proxy service:
receiving an authentication response message from a client that includes an authentication token and a unique session identifier;
determining whether the unique session identifier in the authentication response message received from the client is stored on the proxy service;
if the unique session identifier in the authentication response message received from the client is stored on the proxy service, sending the authentication response message with the authentication token and the unique session identifier to a service provider to which the authentication response message is directed; and
if the unique session identifier in the authentication response message received from the client is not stored on the proxy service:
sending a login request message to the service provider to which the authentication response message is directed,
receiving an authentication request message from the service provider that includes an other unique session identifier and redirects the authentication request message to an identity provider, storing the other unique session identifier on the proxy service, and sending the authentication request message with the other unique session identifier to the client.

15. The computer storage media of claim 14, the system including the identity provider, the identity provider having one or more processors and at least one computer storage medium having computer executable instructions stored thereon which, when executed by the one or more processors, cause the one or more processors to:

receive an authentication request message from the client;

authenticate user credentials included in the authentication request message from the client and generate an authentication token;

determine whether a proxy service redirect is defined that is relevant to the authentication request message from the client and that identifies the proxy service for redirect;

if the proxy service redirect is defined that is relevant to the authentication request message from the client, generate an authentication response message that is configured to redirect to the proxy service and includes the generated authentication token; and send the authentication response message that is configured to redirect to the proxy service and includes the generated authentication token to the client.

16. The computer storage media of claim 15, where one or more parameters included in the authentication request received by the identity provider from the client are utilized by the identity provider to determine whether a proxy service redirect is defined that is relevant to the authentication request message from the client.

17. The computer storage media of claim 14, where the unique session identifier comprises a first nonce and the other unique session identifier comprises a second nonce.

18. The computer storage media of claim 14, where the client and the service provider are configured to operate in accordance with a predefined authentication protocol and the proxy service is configured to communicate with the client and the service provider in accordance with the predefined authentication protocol, such that the client device and service provider do not require operational modification from the predefined authentication protocol.

19. The computer storage media of claim 14, where the proxy service comprises a suffix proxy service and identifying data for the suffix proxy service is appended to a universal resource locator corresponding to the service provider.

20. The computer storage media of claim 14, where the login request message sent by the proxy service to the service provider to which the authentication response message is directed includes state data that matches state data in the authentication response message.

* * * * *